United States Patent
Huang et al.

(10) Patent No.: US 6,788,210 B1
(45) Date of Patent: Sep. 7, 2004

(54) METHOD AND APPARATUS FOR THREE DIMENSIONAL SURFACE CONTOURING AND RANGING USING A DIGITAL VIDEO PROJECTION SYSTEM

(75) Inventors: Peisen Huang, S. Setauket, NY (US); Qingying Hu, Clifton Park, NY (US); Fu-Pen Chiang, Setauket, NY (US)

(73) Assignee: The Research Foundation of State University of New York, Albany, NY (US)

( * ) Notice: Subject to any disclaimer, the term of this patent is extended or adjusted under 35 U.S.C. 154(b) by 171 days.

(21) Appl. No.: 10/088,133

(22) PCT Filed: Sep. 15, 2000

(86) PCT No.: PCT/US00/25220

§ 371 (c)(1),
(2), (4) Date: Aug. 5, 2002

(87) PCT Pub. No.: WO01/20539

PCT Pub. Date: Mar. 22, 2001

Related U.S. Application Data

(60) Provisional application No. 60/154,063, filed on Sep. 16, 1999.

(51) Int. Cl.[7] .............................................. G08B 21/00
(52) U.S. Cl. ........................ 340/612; 382/154; 382/286
(58) Field of Search ................................ 340/435, 436, 340/612, 995.1, 995.14, 580; 382/141, 144, 145, 154, 286; 250/204, 205, 559.23; 356/359, 376, 512

(56) References Cited

U.S. PATENT DOCUMENTS

| | | |
|---|---|---|
| 3,694,088 A | 9/1972 | Gallagher et al. .......... 356/495 |
| 3,749,493 A | 7/1973 | Macovski ...................... 356/2 |
| 4,634,278 A | 1/1987 | Ross et al. .................. 356/376 |
| 4,639,139 A | 1/1987 | Wyant et al. ............... 356/497 |
| 4,641,972 A | 2/1987 | Halioua et al. ............. 356/604 |
| 4,657,394 A | 4/1987 | Halioua ....................... 356/604 |
| 4,984,893 A | 1/1991 | Lange ......................... 356/603 |
| 4,988,886 A | 1/1991 | Palum et al. .......... 250/559.07 |
| 5,069,548 A | 12/1991 | Boehnlein ................... 356/605 |
| 5,075,562 A | 12/1991 | Greivenkamp, Jr. et al. ...................... 250/559.05 |
| 5,307,151 A | 4/1994 | Hof et al. ................... 356/604 |
| 5,307,152 A | 4/1994 | Boehnlein et al. .......... 356/605 |
| 5,337,289 A * | 8/1994 | Fasching et al. ............ 340/612 |
| 5,561,526 A * | 10/1996 | Huber et al. ................ 356/604 |
| 5,633,755 A | 5/1997 | Manabe et al. ............. 359/443 |
| 5,636,025 A | 6/1997 | Bieman et al. ............. 356/619 |

(List continued on next page.)

FOREIGN PATENT DOCUMENTS

| | | |
|---|---|---|
| EP | 0076866 | 4/1983 |
| EP | 0769674 A | 4/1997 |

OTHER PUBLICATIONS

Angel, J. R. P. and Wizinowich, P., "A Method for Phase Shifting Interferometry the Presence of Vibration," European Southern Observatory Conf. Proc., 30, 561; (1988).

(List continued on next page.)

Primary Examiner—Van T. Trieu
(74) Attorney, Agent, or Firm—Hoffmann & Baron, LLP

(57) ABSTRACT

A three dimensional surface contouring and ranging system (10) based on a digital fringe projection (18) and phase shifting technique is disclosed. In the system, three phase-shifted fringe patterns and an absolute phase mark pattern are used to determine the absolute phase map of the object (12). The phase map is then converted to the absolute x, y, and z coordinates of the object surface by a transformation algorithm. A calibration procedure is used to determine accurate values of system parameters required by the transformation algorithm. The parameters are initially indirectly measured through experiments to determine their approximate values. A calibration plate is then measured by the system at various positions. An iteration algorithm is then used to estimate the system parameters.

19 Claims, 21 Drawing Sheets

U.S. PATENT DOCUMENTS

| | | | | |
|---|---|---|---|---|
| 5,680,215 | A | * 10/1997 | Huber et al. | 356/600 |
| 5,825,495 | A | 10/1998 | Huber | 356/600 |
| 5,835,218 | A | 11/1998 | Harding | 356/521 |
| 6,522,777 | B1 | * 2/2003 | Paulsen et al. | 382/154 |
| 6,603,103 | B1 | * 8/2003 | Ulrich et al. | 250/205 |

OTHER PUBLICATIONS

Arai, Yasuhiko, Yekozeki, Shunsuke, and Yamada, Tomoharu, "3–D automatic precision measurement system by liquid crystal plate on moiré–topography," Proc. SPIE, vol. 1554B, 266–274 (1991).

Asundi, A., Digital Moire—Techniques and Applications, Proc. SPIE, vol. 3407, 468–476 (1998).

Asundi, A., "Novel grating methods for optical inspection," Proc. SPIE, vol. 1554B, 708–715 (1991).

Asundi, A., "Projection moiré using PSALM," Proc. SPIE, vol. 1554B, 257–265 (1991).

Asundi, A., "Fringe analysis in moiré interferometry," Proc. SPIE, vol. 1554B, 472–480 (1991).

Bieman, Leonard H., "Survey of design considerations for 3–D imaging systems," Proc. SPIE, vol. 1005, 138–144 (1988).

Bieman, Leonard H., Harding, Kevin G., and Boehnlein, Albert, "Absolute measurement using field shifted moiré," Proc. SPIE, 1614, 259–264 (1991).

Blais, F. and Rioux, M., "BIRIS: A Simple 3–D Sensor," Proc. SPIE, vol. 728, 235 (1986).

Boehnlein, A.J. and Harding, K.G., "Adaptation of a Parallel Architecture Computer to Phase Shifted Moiré Interferometry," Proc. SPIE, vol. 728, 183–193 (1986).

Boehnlein, Albert, and Harding, Kevin G., "Field shift moiré, a new technique for absolute range measurement," Proc. SPIE, vol. 1163, 2–9 (1989).

Bruning, J. H., Herriott, D.R., Gallagher, J.E., Rosenfeld, D.P., White, A. D., and Brangaccio, D. J., "Digital Wavefront Measuring Interferometer for Testing Optical Surfaces and Lenses," Appl. Opt., 13, 2693 (1974).

Carre, P., "Installation et utilisation du comparateur photoelectrique et interferentiel du Bureau International des Poids et Mesures," Metrologia 2, 13 (1996).

Chiang, F.P., "Moiré Methods of Strain Analysis," in Manual on Experimental Stress Analysis, A.S. Kobayashi, Ed., Soc. for Exp. Stress Anal., Brookfield Center, Ct, 1983, pp. 51–69.

Chiang, F. P., "Moire Methods for Contouring, Displacement, Deflection, Slope, and Curvature," Proc. SPIE, vol. 153, 113–119 (1978).

Chiang, F.P., "Techniques of optical signal filtering parallel to the processing of moiré–fringe patterns," Exp. Mech., 9(11), 523–526 (1969).

Creath, K. "Phase–Measurement Interferometry Techniques," in Progress in Optics. vol. XXVI, E. Wolf, Ed., Elsevier Science Publishers, Amsterdam, 1988, pp. 349–393).

Dai, Y.Z. and Chiang, F.P., "Moiré interferometry applied to topographic contour measurement," Proc. SPIE, 954, (1988).

Geng, Z. Jason, "Rainbow three–dimensional camera: new concept of high–speed three–dimensional vision systems," Optical Engineering, 35 (2), 376–383 (1996).

Giovanna Sansoni et al.; "A Novel, Adaptive System for 3–D Optical Profilometry Using a Liquid Crystal Light Projector"; IEEE Transactions on Instrumentation and Measurement 43(4): 558–566; Aug. 4, 1994; U.S.

Greivenkamp, J. E., "Generalized Data Reduction for Heterodyne Interferometry," Opt. Eng., 23, 350 (1984).

Grievenkamp, J.E. and Bruning, J.H., "Phase Shifting Interferometry," in OPtical Ship Testing, 2d Ed., Daniel Malacara, John Wiley & Sons, pp. 501–598 (1992).

Gove, R.J., "DMD Display Systems: The Impact of an All–Digital Display," SID 94 Digest, 673–676 (1994).

Halioua, M., Krishnamurthy, R.S., Liu, H. –C., and Chiang, F.P., "Automated 360° Profilometry of 3–D Diffuse Objects," Appl. Opt., 24(12), 2193–2196 (1985).

Halioua, M., Krishnamurthy, R. S., Liu, H., and Chiang, F. P., "Projection moire with moving gratings for automated 3–D topography," Appl. Opt. 22, 850–855 (1983).

Halioua, M. and Liu, H. –C., "Optical Three–Dimensional Sensing by Phase Measuring Profilometry," Opt. Lasers Eng., 11(3), 185–215 (1989).

Harding, K.G., Coletta, Michael P., Van Dommelen Carl H., "Color encoded moiré contouring," SPIE Proc. vol. 1005 Optics, Illumination, and Image Sensing for Machine Vision III, 169–178 (1988).

Hariharan, P., Oreb, B. F., and Eiju, T., "Digital Phase–Shifting Interferometry: A Simple Error–Compensating Phase Calculation Algorithm," Appl. Opt., 26, 2504 (1987).

Hobrough, G. and Hobrough, T., "Stereopsis for robots by interative stereo image matching," Proc. SPIE, vol. 449, 94–102 (1983).

Hornbeck, Larry, J., "Current Status of the Digital Micromirror Device (DMD) for Projection Television Applications," IEEE IEDM 93–381–384.

Hornbeck, Larry, J., "Deformable–Mirror Spacial Light Modulators," Proc. SPIE, vol. 1150 (1989).

Hornbeck, Larry, J., "Digital Light Processing and MEMS: Timely Convergence for a Bright Future," available at http://www.ti.com (1996).

Huang, P.S., Hu, Q., Jin, F., and Chiang F.P., "Color–encoded fringe projection and phase shifting for 3D surface contouring," Proc. SPIE vol. 3407, 477–482 (1998).

Kujawinska, M., "Use of Phase–Stepping Automatic Fringe Analysis in Moiré Interferometry," Appl. Opt. 26(22), 4712–4714 (1987).

Moore, D.T. and Truax, B.E., "Phase–Locked Moiré Fringe Analysis for Automated Contouring of Diffuse Surfaces," Appl. Opt., 18(1), 91–96 (1979).

Sampsell, J.B., "An Overview of the Performance Envelope of Digital–Micromirror–Device–Based Projection Display Systems," SID Digest, 669–672 (1994).

Sansoni, G., Docchio F., Minoni U., and Bussolati C., "Development and characterization of a liquid crystal projection unit for adaptive structured illumination," Proc. SPIE, 1614, 78–86 (1991).

Sansoni, G., Rodella, R., "Fast digitization of heritage objects by means of a 3D vision system based on the projection of structured light," University of Brescia, pp. 1–11.

Schwider, J. Burow, R., Elssner, K. E., Grzanna, J., Spolaczyk, R., and Merkel K., "Digital Wavefront Measuring Interferometry: Some Systematic Error Sources," Appl. Opt., 22, 3421 (1983).

Shaw, M.M., Harvey, D.M., Hobson, C.A., and Lalor, M.J., "Non–contact ranging using dynamic fringe projection," Proc. SPIE, vol. 1163, 22–29 (1989).

Srinivasan, V. H., Liu, H. –C., and Halioua, M., "Automated Phase–Measuring Profilometry of 3–D Diffuse Objects," Appl. Opt., 23(18), 3015–3018 (1984).

Srinivasan, V. H., Liu, H. –C., and Halioua, M., "Automated Phase–Measuring Profilometry: a phase mapping approach." Appl. Opt., 24(2), 185–188 (1985).

Stahl, Philip H., "White–light phase–measuring interferometry," Proc. SPIE, vol. 1332, 720–728 (1990).

Stumpf, K.D., "Real–Time Interferometer," Opt. Eng., 18, 648 (1979).

Svetkoff, D.J., Leonard, P.F., Sampson, R.E., and Jain, R., "Techniques for Real–Time, 3D, Feature Extraction Using Range Information," Proc. SPIE, vol. 521, 302 (1984).

Takasaki, H., "Moiré Topography," Applied Optics 9 (6), 1457–1472 (1970).

Toyooka, S. and Iwaasa, Y., "Automatic Profilometry of 3–D Diffuse Objects by Spatial Phase Detection," Appl. Opt., 25(10), 1630–1633 (1986).

Wizinowich, P. L., "System for Phase Shifting Interferometry in the Presence of Vibration," Proc. SPIE, 1164, 25 (1989).

Wizinowich, P. L., "Phase Shifting Interferometry in the Presence of Vibration: A New Algorithm and System," Appl. Opt., 29, 3271 (1990).

Wyant, J.C., "Use of an ac heterodyne lateral shear interferometer with real–time wavefront correction systems," Appl. Opt., 14, 2622 (1975).

Yoshizawa, Toru and Tomisawa, Teiyu, "Moiré topography with the aid of phase shift method," Proc. SPIE, 1554B, 441–450 (1991).

Younse, J.M., "Mirror on a chip," IEEE Spectrum, 30(11),27 (1993).

* cited by examiner

METHOD AND APPARATUS FOR THREE DIMENSIONAL SURFACE CONTOURING AND RANGING USING A DIGITAL VIDEO PROJECTION SYSTEM

This application claims the benefit of U.S. Provisional Application No. 60/154,063, filed Sep. 16, 1999.

STATEMENT OF GOVERNMENT RIGHTS

This invention was made with Government support under grant No. DMI 9713895 provided by the National Science Foundation. The Government has certain rights in the invention.

BACKGROUND OF THE INVENTION

The present invention relates generally to a method and apparatus for three dimensional surface contouring and ranging. In particular, the present invention uses a digital video projection system for digitally generating fringe patterns in three dimensional surface contouring.

Three dimensional surface contouring techniques have numerous applications in design and manufacturing. For example, surface contouring can be used for inspection of industrial parts whose dimensions and geometry need to be checked against their design specifications during or after manufacturing. These techniques can also be used in reverse engineering where construction of a Computer Aided Design (CAD) model from a physical part is required. In recent years, rapid prototyping technology based on a layered manufacturing concept has been established which allows for rapid fabrication of physical concept models, functional parts, and toolings directly from CAD models. Surface contouring techniques can help extend the capabilities of current rapid prototyping systems to include building physical parts and toolings from hand-crafted models or parts for which a CAD model is not available. Surface contouring techniques can also help improve the accuracy of constructed models by introducing in-process or post-process inspection into the rapid prototyping process.

Many optical three dimensional contouring methods have been developed and are well known in the art. The methods can generally be categorized into two groups: scanning and non-scanning imaging techniques. (Bieman, Leonard H., "Survey of design considerations for 3-D imaging systems," Proc. SPIE, Vol. 1005, 138–144 (1998)). The scanning techniques are represented by point triangulation (Blais, F. and Rioux, M., "BIRIS: a simple 3-D sensor," Proc. SPIE, Vol. 723, 235 (1986)), laser radar (Svetkoff, D. J., Leonard, P. F., and Sampson, R. E., "Techniques for real-time, 3-D feature extraction using range information," Proc. SPIE, Vol. 521, 302 (1984)),: and structured line methods. Point triangulation and structured line methods are based on the triangulation principle and the laser radar methods are based on the measurement of the travel time or phase of either a pulsed or modulated laser. All these techniques require either one-dimensional or two-dimensional scanning of the laser to cover the entire surface of the object. This generally makes the systems more sophisticated and the measurement more time consuming.

Typical non-scanning techniques include stereo vision and moire interferometry. Stereo vision obtains three-dimensional information of an object by viewing a scene from two different perspectives and then locating common features in both images. (Hobrough, G. and Hobrough, T., "Stereopsis for robots by iterative. stereo image matching," Proc. SPIE, Vol. 449, 62 (1983)). The processing of the images is computationally intensive, which makes the technique unsuitable for high-speed 3-D contouring.

Moiré interferometry is one of the most commonly used techniques for 3-D surface contouring. Compared to other techniques, it has the primary advantage of fast measurement speed due to the fact that it does not require scanning to cover the whole object surface and the image processing for extracting 3-D contour information is relatively simple. Moiré contouring techniques can be classified as either shadow moiré (Chiang, F. P., "Moiré Methods for Contouring, Displacement, Deflection, Slope, and Curvature," Proc. SPIE, Vol. 153, 113–119 (1978)) or projection moiré (Khetan, R. P. and F. P. Chiang, "On the theory of two projection moire methods," Univ. Of Ill. at Chicago press, 8, 16–18 (1977); Halioua, M., Krishnamurthy, R. S., Liu, H., and Chiang, F. P., "Projection moire with moving gratings for automated 3-D topography," Appl. Opt. 22, 850–855 (1983)). Shadow moiré uses the same grating for both illumination and observation, while projection moiré uses separated gratings. Another surface contouring technique is fringe projection which uses only one grating and measures surface height by triangulation.

An advantage of shadow moiré is that it is easy to obtain quantitative contour information from the moiré pattern because the grating is flat and its period known. However, the contouring of large objects is difficult because a grating with approximately the same size as the object must be used. Large gratings are difficult to make and have limited mobility.

Projection moiré and fringe projection offer advantages in their ability to contour large objects and the ease with which phase measuring techniques can be implemented to increase the measurement resolution. Their primary limitation is the tedium associated with obtaining quantitative height information. This limitation arises because it is necessary to calibrate both the projection geometry and the magnification factor.

In order to increase contouring resolution, phase shifting techniques developed in interferometry have been widely adopted and used in moiré and fringe projection methods for 3-D surface contouring. The resolution of the moiré and fringe projection contouring methods depends on the density of the fringe projected on the object. Generally, higher fringe density means higher resolution. However, there is a limit to the fringe density that can be applied because overly dense fringes may not be resolvable by the camera. To solve this dilemma, phase shifting techniques have been developed and widely used in optical contouring applications (Halioua, M. and Liu, H.-C., "Optical Three-Dimensional Sensing by Phase Measuring Profilometry," Opt. Lasers Eng., 11(3), 185–215 (1989); Moore, D. T. and Truax, B. E., "Phase-Locked Moiré Fringe Analysis for Automated Contouring of Diffuse Surfaces," Appl. Opt., 18(1), 91–96 (1979); Srinivasan, V. H., Liu, H. -C., and Halioua, M., "Automated Phase-Measuring Profilometry of 3-D Diffuse Objects," Appl. Opt., 23(18), 3015–3018 (1984); Srinivasan, V. H., Liu, H. -C., and Halioua, M., "Automated Phase-Measuring Profilometry of 3-D Diffuse Objects," Appl. Opt., 24(2), 185–188 (1985); Boehnlein, A. J. and Harding, K. G., "Adaptation of a Parallel Architecture Computer to Phase Shifted Moiré Interferometry," Proc. SPIE, Vol. 728, 183–193 (1986); Kujawinska, M., "Use of Phase-Stepping Automatic Fringe Analysis in Moiré Interferometry," Appl. Opt. 26(22), 4712–4714 (1987); Toyooka, S. and Iwaasa, Y., "Automatic Profilometry of 3-D Diffuse Objects by Spatial Phase Detection," Appl. Opt.,25(10), 1630–1633 (1986)). Phase shifting dramatically increases measurement resolution without the need of using high density fringes. Traditional phase shifting is accomplished by mechanically shifting a grating to create a series of phase shifted fringe patterns. The phase shifted fringe patterns then are processed to extract the phase of each pixel of the image using algorithms well known in the art.

Phase shifted images are generally obtained by mechanically translating a grating. The shortcomings are that the system becomes more complicated because of the introduction of moving parts into the system and the phase shifting may not be accurate due to mechanical errors. The Phase Shifting And Logical Moiré (PSALM) was proposed to eliminate some of the problems with traditional phase shifting techniques (Asundi, A., "Projection moiré using PSALM," Proc. SPIE, Vol. 1554B, 257–265 (1991)). PSALM uses only one grating with the other grating generated by software in a computer. The phase-shifted moiré fringes are obtained through logic calculations on the image of the object and the software created grating. Since no moving parts are necessary, this technique greatly simplifies the contouring system. The problem with this technique is that the contouring result is subject to possible errors due to surface reflectivity changes and existing surface marks. Other attempts to simplify the contouring system used a Liquid Crystal Display (LCD) panel as the projection system (Asundi, A., "Fringe Analysis in Moiré Interferometry," Proc. SPIE, Vol. 1554B, 472–480 (1991); Arai, Yasuhiko, Yekozeki, Shunsuke, and Yamada, Tomoharu, "3-D automatic precision measurement system by liquid crystal plate on moiré-topography," Proc. SPIE,Vol. 1554B, 266–274 (1991)). With the creation of the fringe pattern and phase shifting being done by software, the system is flexible and simple. However, because of the low image brightness and contrast of LCD panels (Sansoni, G., Docchio F., Minoni U., and Bussolati C., "Development and characterization of a liquid crystal projection unit for adaptive structured illumination," Proc. SPIE, 1614, 78–86 (1991)), the quality of the fringe pattern reflected from the object is poor which causes errors in extracting surface contour information. For this reason, any meaningful contouring can only be done for small objects.

Another traditional problem associated with the phase-shifting technique is the modulo $2\pi$ ambiguity caused by the phase extraction process using the arc-tangent function which has values only between $-\pi/2$ and $\pi/2$. Even though with corrections, the phase calculation range can be extended to 0 to $2\pi$, the absolute phase still cannot be recovered. This means that if the object surface has discontinuous features, such as step-like jumps, and the height change causes a phase change exceeding $2\pi$, then the phase extraction process cannot provide the correct height information. Accordingly, traditional phase shifting technology usually cannot be applied to measure surfaces with discontinuous geometric features. To eliminate this problem, a new technique, namely, field-shift moire, was proposed (Boehnlein, Albert, and Harding, Kevin G., "Field shift moiré, a new technique for absolute range measurement," Proc. SPIE, Vol. 1163, 2–9 (1989)). Field-shift moiré shifts the whole projection system including the grating and the light source to capture a series of field-shifted images. With proper mathematical manipulation, both the fringe order and the phase of each pixel can be extracted to yield absolute measurement of the surface contour even for prismatic objects with discontinuous features. The problem, however, is the need to shift the whole projection system in accurate steps, which makes the system even more complicated than the traditional grating shifting technique.

When using phase shifting, at least three images, each with certain phase shift, must be taken to reconstruct the contour of the object. Traditionally, these phase shifted images are taken sequentially which limits the technique only to the contouring of static objects. In many engineering applications, 3-D surface contouring of objects under quasi-static or dynamic changes provides critically important information about the objects. In such applications, quickly capturing 3-D surface contours of objects becomes necessary. There have been some reports on using color as a means to boost contouring speed while keeping the resolution intact. K. G. Harding "Color encoded moire contouring," SPIE Proc. Vol. 1005 Optics, Illumination, and Image Sensing for Machine Vision III, 169–178 (1988) and European Patent No. EP0076866, Harding proposed a color-encoded moiré technique that retrieves the 3-D surface contour of an object from a single snap shot of the object illuminated by a color-encoded fringe pattern. Contouring speed was limited only by the frame rate of the camera. However, since the color-encoded fringe pattern produced on a Polaroid film had a poor contrast ratio, no actual contouring of objects was attempted.

European Patent No. EP0076866 discloses the simultaneous projection of three color-coded patterns on an object with the patterns being phase-shifted by 120 degrees relative to each other. The grating patterns deformed by the object surface are recorded corresponding to their color coding by three associated color-selective cameras. As a result of this, the pattern is recorded simultaneously in three different phase relations so that an evaluation based on phase shifting algorithms may be performed without requiring a mechanical shifting.

International Publication Number WO 99/34301, which was developed by two of the coinventors of the present invention, discloses a three dimensional surface contouring method and apparatus based on the full-field fringe projection technique. A digital video projection system is used to project digitally created fringe patterns onto the object. The fringe pattern distorted by the geometry of the object surface is then captured by a high resolution CCD camera. To increase contouring resolution, purely software-based digital phase shifting technique is used, which eliminates the need for accurate positioning systems in the traditional phase shifting methods. The surface is reconstructed by applying the phase wrapping and unwrapping algorithms. The disclosure of International Publication Number WO 99/34301 is incorporated herein by reference.

Each of the methods and apparatus described above has inherent shortcomings which detract from their use in three dimensional imaging, and it is an object of the present invention to overcome such shortcomings and to provide an improved method and apparatus for three dimensional surface contouring.

SUMMARY OF THE INVENTION

The present invention is a method and apparatus for three dimensional surface contouring and ranging. The present invention uses a digital video projector for projecting fringe patterns in surface contouring.

The method of three dimensional surface contouring of an object having a. surface defining a geometry includes generating a plurality of phase shifted digitally-interpretable fringe pattern signals with each signal being generated at a separate phase angle. The signals are then converted into optical phase shifted fringe patterns which are projected onto the surface of the object. The geometry of the object distorts the fringe patterns. A reflection of each of the distorted fringe patterns is individually retrieved. The distorted fringe patterns are combined to generate a phase-wrapped image. The phase-wrapped image is unwrapped to generate a relative phase map of the surface of the object. An absolute-phase mark is projected onto the surface and the reflection of the absolute-phase mark is retrieved. An absolute phase map is generated by translating the relative phase map. Preferably the coordinates of the surface of the object are obtained by transforming the absolute phase map.

The apparatus for three dimensional surface contouring of an object includes a signal generator that generates an absolute-phase mark signal and a plurality of phase shifted digitally-interpretable fringe pattern signals with each of the signals being generated at a separate phase angle. A digital video projector receives the signals from the signal generator. The digital video projector converts the fringe pattern signals into optical fringe patterns and the absolute-phase mark signal into an absolute-phase mark. The digital video projector projects the fringe patterns and absolute-phase mark onto the surface of the object. The fringe patterns are distorted by the geometry of the object and an optical retrieval device retrieves a reflection of the distorted fringe pattern and a reflection of the absolute-phase mark. An image generator combines the distorted fringe patterns and reconstructs a relative phase map of the surface of the object and translates the relative phase map to generate an absolute phase map. Preferably the image generator is configured to transform the absolute phase map into coordinates of the surface of the object.

In a preferred embodiment of the invention, at least three phase shifted fringe patterns are generated separated by 120 degrees. The phase shifted fringe patterns can be projected sequentially. Preferably the sequential projection of the phase shifted fringe patterns is synchronized to increase contouring speed. Contouring speed can also be increased by projecting a plurality of phase shifted fringe patterns substantially simultaneously by color encoding the phase shifted fringe patterns. The absolute-phase mark can correspond to only one pixel. Preferably the absolute-phase mark is a line. The absolute-phase mark can be projected simultaneously with at least one of the fringe patterns. Preferably the absolute-phase mark is color encoded. Preferably where there are a number of phase shifted fringe patterns, the phase shifted fringe patterns are separated by the quotient of 360 degrees divided by the number of phase shifted fringe patterns.

As a result of the present invention, a method and apparatus for three dimensional surface contouring and ranging is provided. A particular advantage is that since the fringe patterns are generated digitally and projected by a digital video projector the fringe patterns have exceptionally high brightness and contrast ratio. In addition, since the fringe patterns are generated digitally, fringes with any cross-sectional intensity profile and spacing can be produced. Further, the digitally controlled phase shifting technique eliminates the traditional need for physically shifting a grating or other optical components which translates into higher contouring accuracy. Moreover, fringe patterns can now be easily color encoded for a variety of applications.

For a better understanding of the present invention, reference is made to the following description to be taken in conjunction with the accompanying drawings and its scope will be pointed out in the appended claims.

BRIEF DESCRIPTION OF THE DRAWINGS

Preferred embodiments of the invention have been chosen for purposes of illustration and description and are shown in the accompanying drawings, wherein.

DETAILED DESCRIPTION OF THE INVENTION

Figure 1:
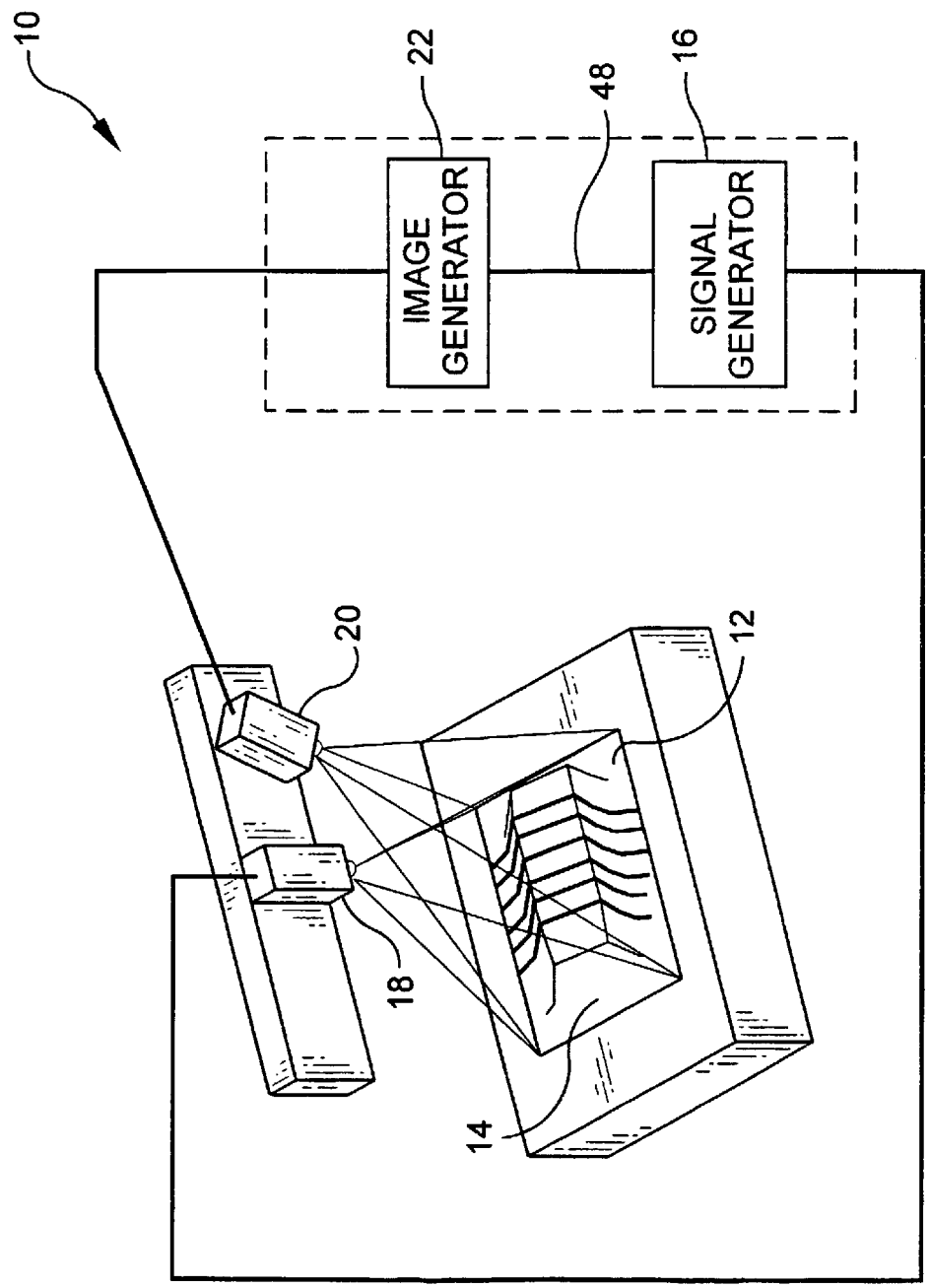
FIG. 1 is a perspective view of the surface contouring device of the present invention with some of the attributes shown schematically.

Initially referring to FIG. 1 a surface contouring device 10 in accordance with the present invention is shown. The surface contouring device 10 includes a signal generator 16, a digital video projector 18, an optical retrieval device 20, and an image generator 22.

The signal generator 16 generates a digitally-interpretable fringe pattern signal that is received by the digital video projector 18 for conversion to an optical fringe pattern. The signal generator 16 is capable of generating digitally-interpretable fringe pattern signals to produce any type of optical fringe pattern including sinusoidal patterns, binary structured-line patterns, and circular patterns as known to those skilled in the art. Most importantly, the signal generator 16 can generate a plurality of phase shifted digitally-interpretable fringe pattern signals for producing a plurality of optical phase shifted fringe patterns without the traditional mechanical shifting of a grating by shifting the phase angle digitally. The signal generator 16 can be, for example, any suitable computer, processor (e.g., digital signal processor, microprocessor, etc.), microcontroller, or circuit configured with the teachings hereof. In experimentation conducted by the inventors using a computer as the signal generator 16, the inventors developed a Windows based program in Visual Basic and also in Visual C++ for generating the signals with a computer. During their experimentation, the inventors used a keyboard and video monitor as an interface for modifying the fringe type, intensity profile, spacing, phase, and color. The signal generator can also use embedded circuitry tailored to specific industrial applications.

Figure 2:
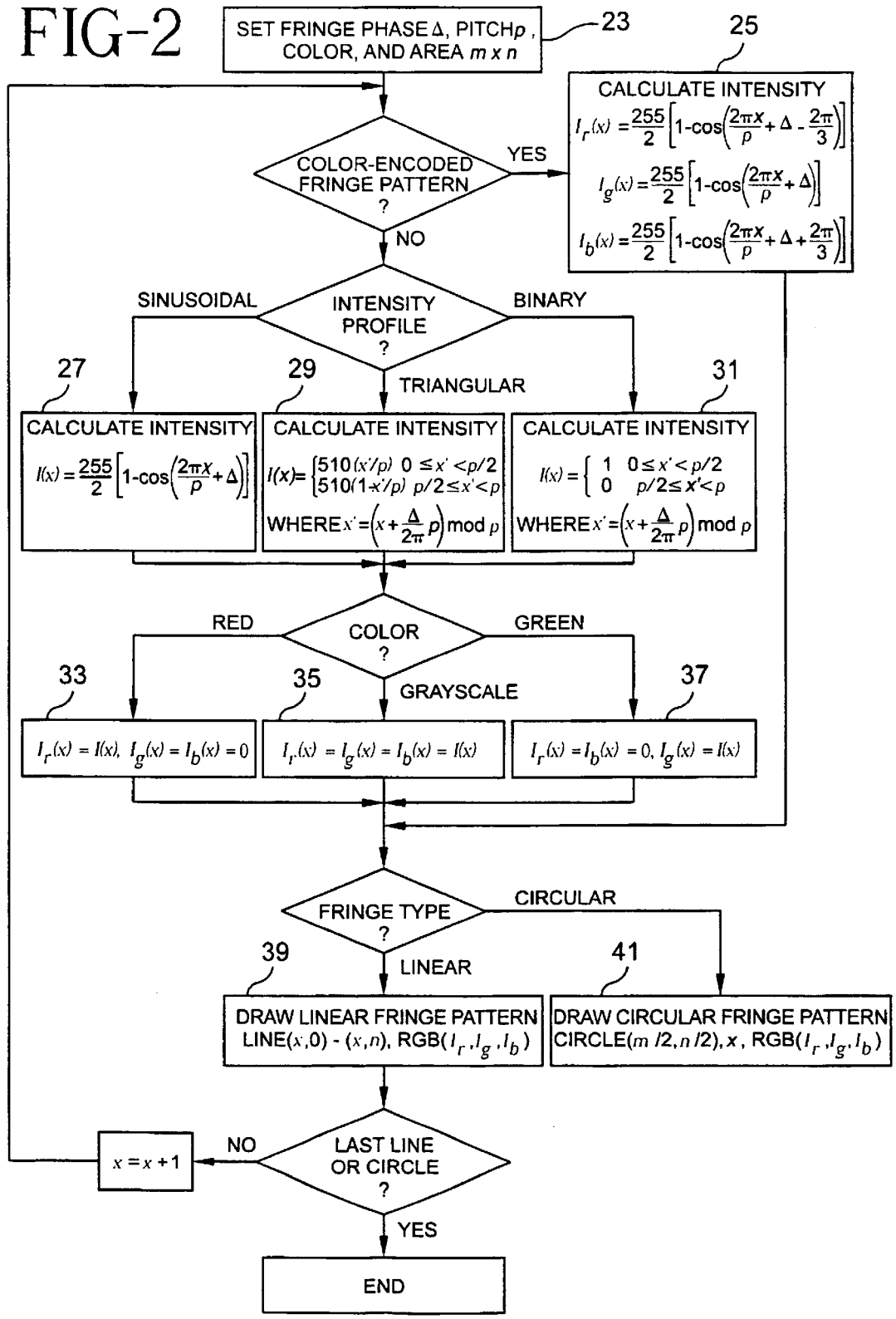
FIG. 2 is a flowchart illustrating an algorithm used by the signal.

Referring now to FIG. 2, a flowchart illustrating the algorithm used by the signal generator 16 is shown. Essentially the signal generator 16 assigns the intensity, I, and color for each pixel of the digital video projector 18, Referring to input block 23, initially the phase angle Δ, pitch p, color, and an array of pixels m×n of the digital video projector for projecting the fringe pattern are selected. If color encoding of the fringe pattern is desired, the intensities are determined as shown in block 25 where $I_r(x)$, $I_g(x)$, and $I_b(x)$ are the intensities of red, green, and blue that are assigned to each line or circle of pixels. Notice that $I_r(x)$, $I_g(x)$, and $I_b(x)$ are each phase shifted by $2\pi/3$ or 120 degrees. A mathematical formula for a sinusoidal fringe pattern is shown in block 25 by way of example only as it is contemplated that fringe patterns having other intensity profiles could be used as well, e.g., triangular. If a single color fringe pattern is to be generated, the intensity profile is determined next. Again by way of example only blocks 27, 29, and 31 include formulations for sinusoidal, triangular and binary intensity profiles respectively that are commonly used by those skilled in the art. Blocks 33, 35 and 37 illustrate examples of generating red, grayscale, and green fringe patterns respectively. Fringe patterns of other colors can be generated in a similar manner. The fringe type is selected next. As shown in blocks 39 and 41 fringe patterns are generally linear or circular, but could be arranged in any desired form. The process of assigning each pixel an intensity and color is repeated until the array m×n is completed.

Although it is preferable to phase shift digitally with the signal generator 16 as discussed above, in an alternative embodiment of the present invention the apparatus can further comprise a mechanical phase shifter for shifting the phase angle. Traditional mechanical phase shifters generally include motors to either translate a grating or the object being imaged, or rotate a glass plate that refracts the projected fringe pattern. Examples of mechanical phase shifters are found in U.S. Pat. Nos. 4,641,972 to Halioua et al., 4,984,893 to Lange, and 5,561,526 to Huber et al., the disclosures of which are incorporated herein by reference.

Figure 5:
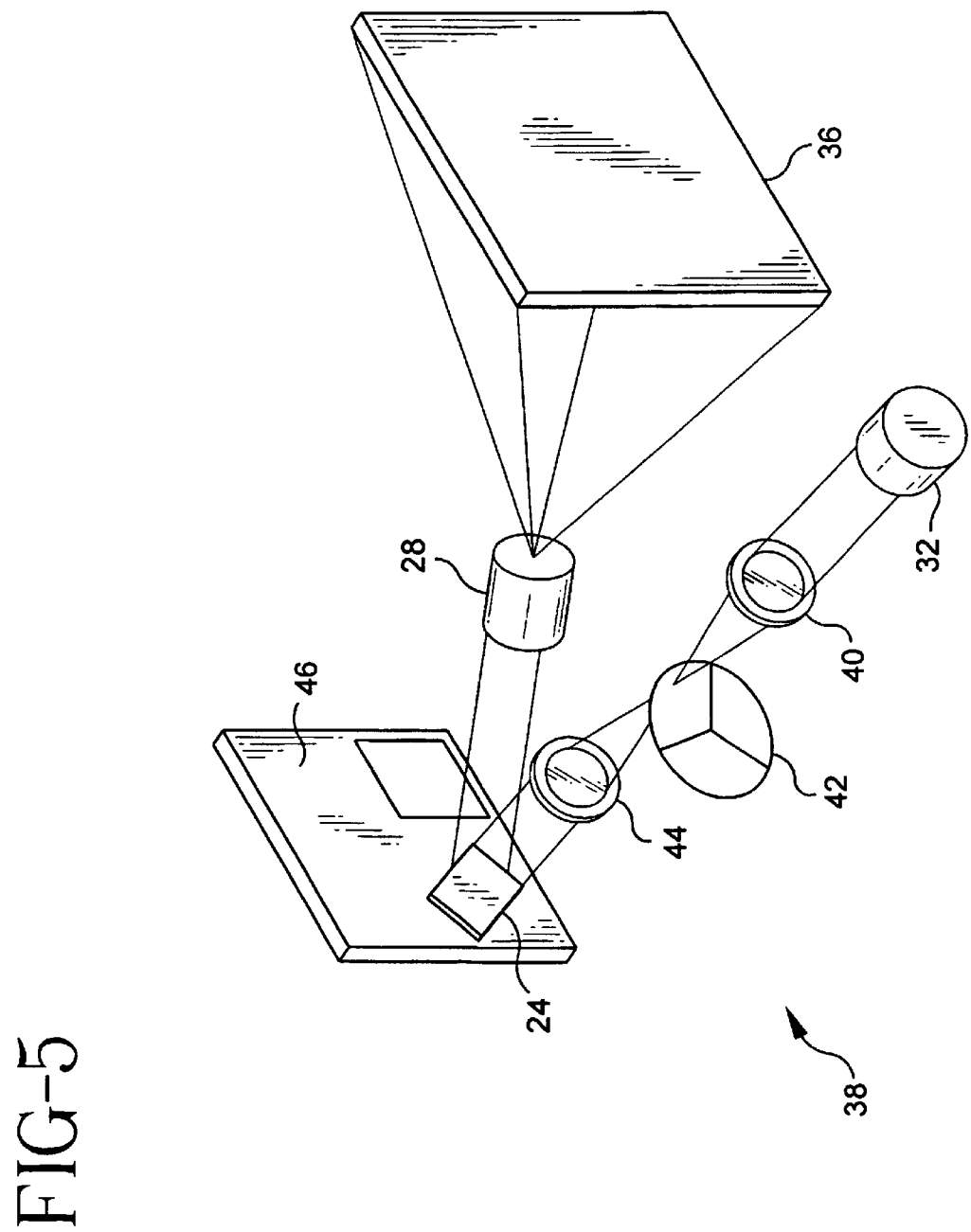
FIG. 5 is an exploded perspective view showing a Digital Light Processing projection system.
Figure 6B:
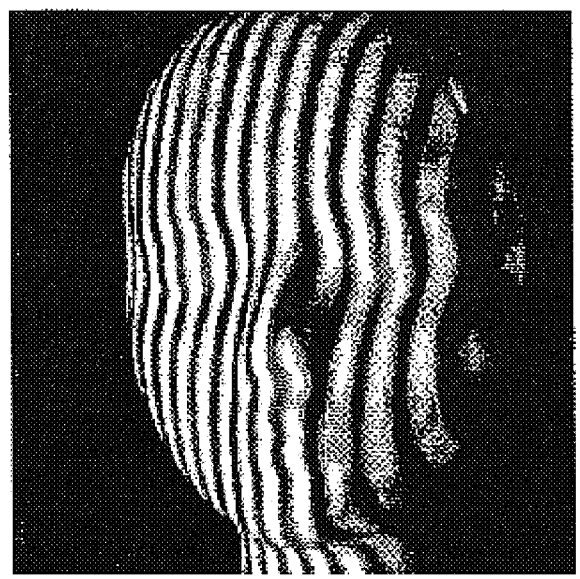
FIG. 6A is a view showing a fringe pattern being projected on a dummy face having a phase angle of 0 degrees.
FIG. 6I is a view showing a fringe pattern being projected on a dummy face having a phase angle of 120 degrees.
FIG. 6C is a view showing a fringe pattern being projected on a dummy face having a phase angle of −120 degrees.
Figure 6A:
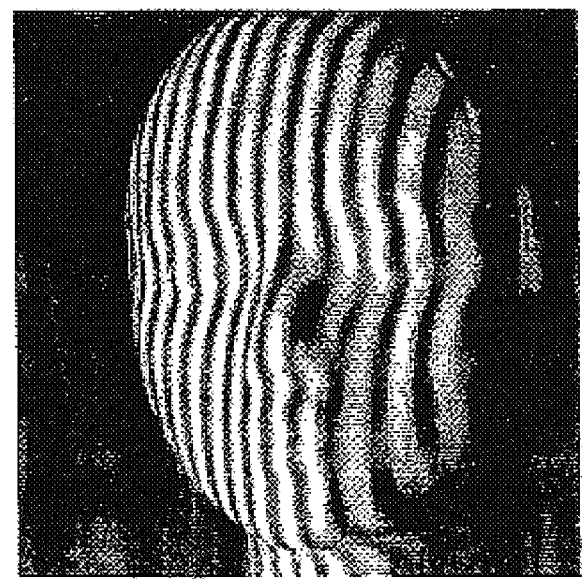
Figure 6C:
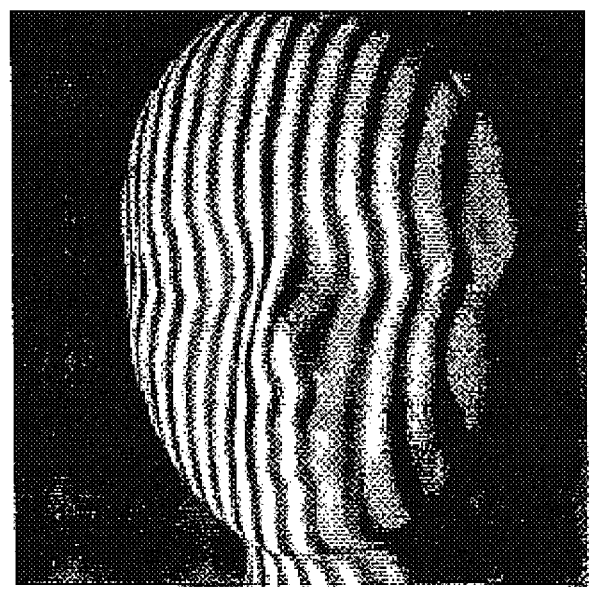
Figure 9:
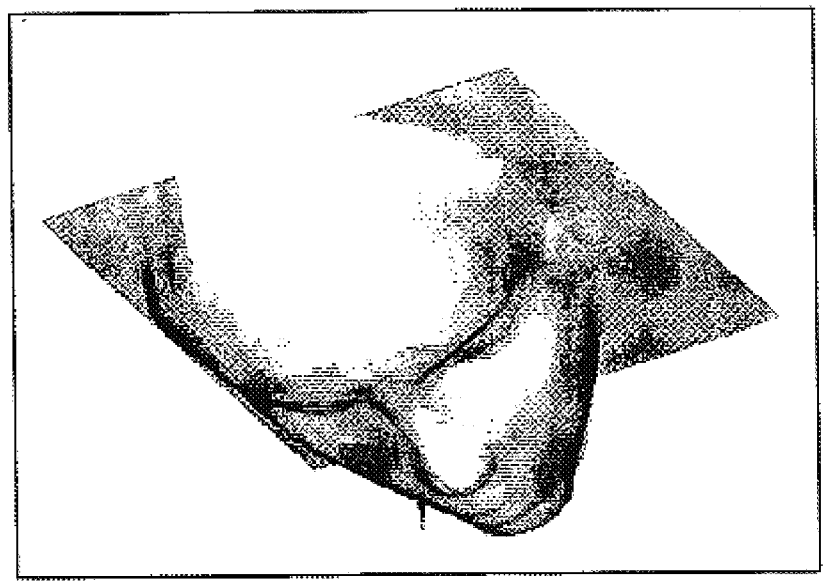
FIG. 9 is a view showing a reconstructed surface of the dummy face shown in FIGS. 6A, 6B, and 6C.

Referring now to FIG. 1, the digital video projector 18 receives the digitally-interpretable fringe pattern signal generated by the signal generator 16 and converts the signal into an optical fringe pattern and projects it onto the surface 14 of the object 12, Examples of phase shifted fringe patterns are shown in FIGS. 6A, 6B, and 6C which have phase angles of 0, 120 and −120 degrees respectively. The projected fringe pattern is then distorted by the geometry of the object 12, Preferably, the digital video projector 18 uses the Digital Light Processing (DLP) with Digital Micromirror Device (DMD) technology recently developed by Texas Instruments Incorporated. (Gove, R. J., "DMD Display Systems: The Impact of an All-Digital. Display," Society for Information Display International Symposium (1994); Hornbeck, Larry, J., "Deformable-Mirror Spacial Light Modulators," Proc. SPIE,: Vol. 1150 (1989); Hornbeck, Larry, J., "Current status of the digital micromirror device (DMD) for projection television applications," IEDM 15.1.1 (1993); Hornbeck, Larry, J., "Digital Light Processing and MEMS: Timely Convergence for a Bright Future," available at http://www.ti.com (1996); Monk, D., "Digital Micromirror Device Technology for Projection Displays," EID Exhibition & Conference (Sandown, UK 1994); Sampbell, J. B., "The digital micromirror device," Proceedings of the 7th ICSS&A (Yokohama, Japan 1993); Sampbell, J. B., "An Overview of the performance Envelope of Digital Micromirror Device Based projection Displays," SID Digest, 669–672 (1994); and Younse, J. M., "Mirror on a chip," IEEE Spectrum, 30(11),27 (1 993)(all of which are incorporated herein by reference)). The Digital Light Processing (DLP) with Digital Micromirror Device (DMD) technology provides the benefits of high brightness, contrast ratio, and image quality when used in three-dimensional surface imaging. A brief overview of the DLP technology with reference to FIGS. 3 to 5 follows below.

Figure 3:
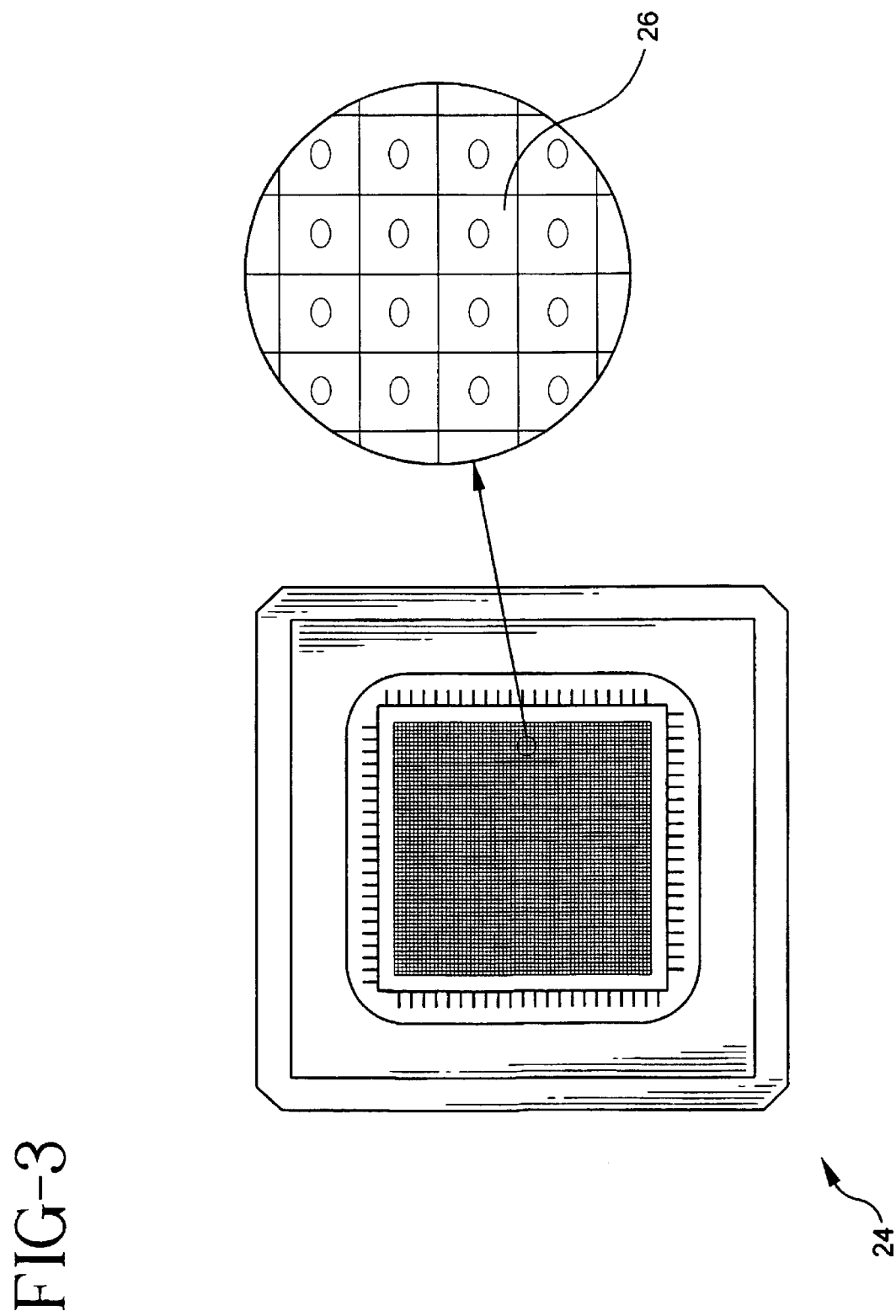
FIG. 3 is an elevational view of a Digital Mirror Device.
Figure 4:
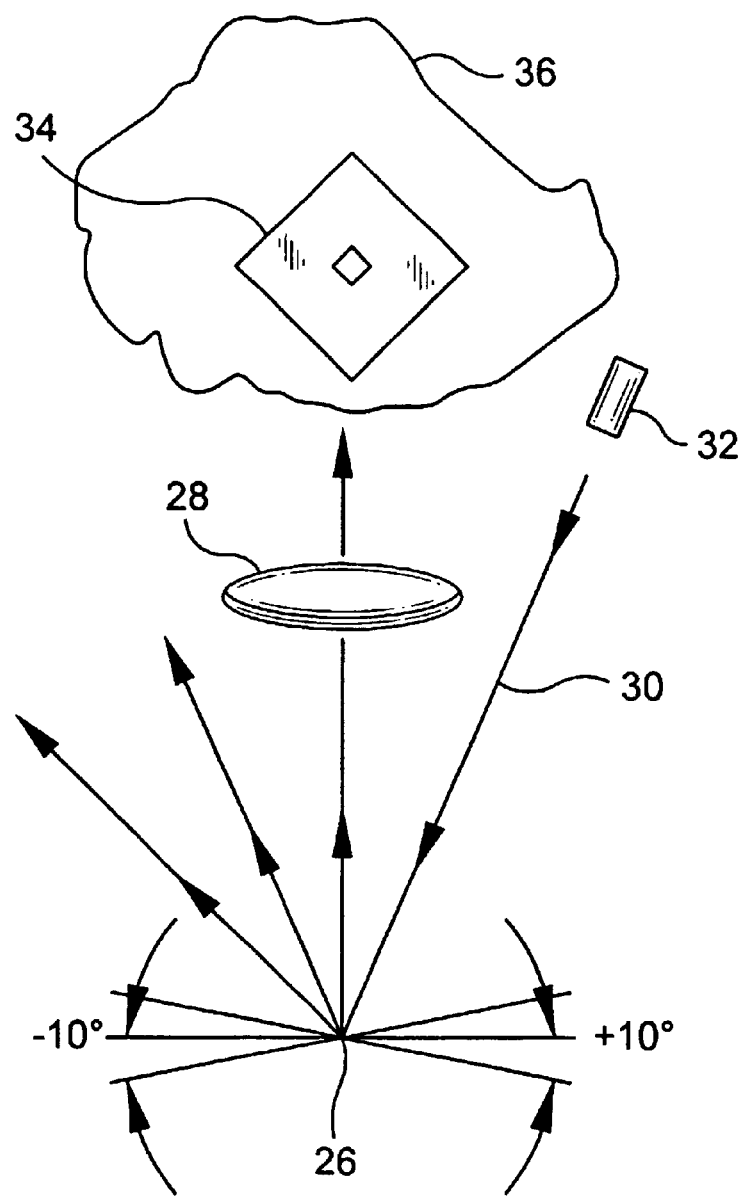
FIG. 4 is a schematic view illustrating the Digital Mirror Device switching principle.

Referring now to FIG. 3, the Digital Micromirror Device (DMD) 24 is a digital light switch integrated circuit having an upper surface that comprises an array of tiny square aluminum pixel mirrors 26, Each pixel mirror 26 of the DMD 24 can be digitally controlled to reflect incident light into or out of an aperture of a projection lens 28 as shown in FIG. 4. FIG. 4 which is adopted from "Digital Light Processing and MEMS: Timely Convergence for a Bright Future," illustrates the optical switching action of the mirror. When the pixel mirror 26 rotates to its on, state, +10 degrees, light 30 from an illuminator 32 is directed into the projection lens 28 and the pixel 34 appears bright on a projection screen 36, When the pixel mirror 26 rotates to its off state, −10 degrees, light 30 from the illuminator 32 is directed away from the projection lens 28 and the pixel 34 appears dark. Each pixel mirror 26 is capable of switching more than 1,400 times a second and yields a potential of 256 gray levels providing for the rapid direction of light into or out of the projection lens 28.

Referring now to FIG. 5 which is also adopted from "Digital Light Processing and MEMS: Timely Convergence for a Bright Future," an example of a typical DLP projection system 38 is shown. The DLP projection system 38 includes an illuminator 32 which is preferably a metal halide lamp. The illuminator 32 produces white light which is passed through a condenser lens 40 for collecting the light and imaging it on a rotating color wheel 42, The color wheel 42 is generally segmented into at least a red, a green, and a blue portion, which can be used to project these components of colored light to produce over 16 million colors. A second lens 44 collects the light that passes through the color wheel 42 and evenly illuminates the surface of the DMD 24, Depending on the rotational state of each pixel mirror 26; (+10 or −10 degrees) of the DMD 24 which are controlled by a DLP circuit board 46, the light is directed either into or away from the projection lens 28, The projection lens 28 then projects an enlarged image on to a projection screen 36, A variety of digital video projectors 18 that use the DLP technology are presently commercially available. Some of the manufacturers include Davis North America, Inc., NEC Technologies Inc., CTX Opto Inc., and In Focus Systems. In the experimentation described herein, the inventors used the LitePro 620 as manufactured by In Focus Systems, Wilsonville, Oreg.

Referring now to FIG. 1, the optical retrieval device 20 retrieves a reflection of the distorted fringe patterns from the surface of the object 12, The optical retrieval device 20 is focused at a different angle than the digital video projector 18 with respect to the surface 14 of the object 12 for the retrieval of the reflection of the distorted fringe pattern. The optical retrieval device 20 can be any electronic camera, such as a CCD, CMOS, or Vidicon camera or film. Preferably the optical retrieval device 20 is a charge coupled device (CCD). A suitable camera for use with the teachings hereof is the Kodak Megaplus Model 4.2i having a charge-coupled device array of 2029(H)×2048(V) pixels providing for the measuring of over 4 million data points simultaneously.

Figure 8:
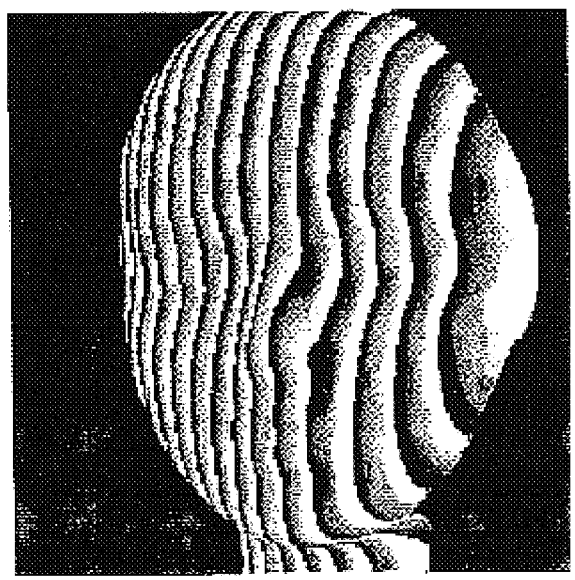
FIG. 8 is a view showing a phase-wrapped image generated from the information contained in FIGS. 6A, 6B, and 6C.

The image generator 22 combines the distorted phase shifted fringe patterns and reconstructs the surface 14 of the object 12, The image generator 22 can be, for example, any suitable computer, processor (e.g., digital signal processor, microprocessor, etc.), microcontroller, or circuit configured with the teachings hereof. As illustrated in phantom in FIG. 1, the image generator 22 and the signal generator can be located within the same housing, e.g., a computer. The reconstruction of the surface of the object is accomplished by using any of the traditional algorithms known from phase shift interferometry to first combine the information from the phase shifted fringe patterns to acquire a phase-wrapped image and then unwrap the phase-wrapped image to reconstruct the surface 14 of the object 12, An example of a phase-wrapped image is shown in FIG. 8 which was generated from the phase shifted images shown in FIGS. 6A, 6B, and 6C.

Initially, the image generator 22 extracts the phase of each pixel of the image to be generated. There are a variety of algorithms that are well known in the art for obtaining the phase. These algorithms include the three-step (Gallagher, J. E. and Herriott, D. R., "Wavefront measurement," U.S. Pat. 3,694,088 (1972); Creath, K. "Phase-Measurement Interferometry Techniques," in Progress in Optics. Vol XXVI, E. Wolf, Ed., Elsevier Science Publishers, Amsterdam, 1988, pp. 349–393), four-step least-squares (Bruning, J. H., Herriott, D. R., Gallagher, J., E., Rosenfeld, D. P., White, A. D., and Brangaccio, D. J., "Digital Wavefront Measuring Interferometer for Testing Optical Surfaces and Lenses," Appl. Opt., 13, 2693 (1974); Greivenkamp, J. E., "Generalized Data Reduction for Heterodyne Interferometry," Opt. Eng., 23, 350 (1984)), the Carre method (Carre, P., "Installation et Utilization du Comparateur Photoelectrique et Interferentiel du Bureau International des Poids de Measures," Metrologia 2, 13 (1996)), averaging 3+3 (Schwider, J. Burow, R., Elssner, K. E., Grzanna, J., Spolaczyk, R., and Merkel K., "Digital Wavefront Measuring Interferometry: Some Systematic Error Sources," Appl. Opt., 22, 3421 (1983); Wyant, J. C. and Prettyjohns, K. N., "Optical Profiler Using Improved Phase-Shifting Interferometry," U.S. Pat. 4,639,139 (1987)), the Hariharan method (Hariharan, P., Oreb, B. F., and Eiju, T., "Digital Phase-Shifting Interferometry: A Simple Error-Compensating Phase Calculation Algorithm," Appl. Opt., 26, 2504 (1987)), and 2+1 (Angel, J. R. P. and Wizinowich, P. L., "A Method of Phase-Shifting in the Presence of Vibration," European Southern Observatory Conf. Proc., 30, 561 (1988);

Wizinowich, P. L., "System for Phase-Shifting Interferometry in the Presence of Vibration," Proc. SPIE, 1164, 25 (1989); Wizinowich, P. L., "Phase-Shifting Interferometry in the Presence of Vibration: A New Algorithm and System," Appl. Opt., 29, 3271 (1990)) algorithms. The aforementioned cited disclosures for obtaining the phase angle are incorporated herein by reference.

In the three-step algorithm, three phase shifted patterns are generated with each phase shifted pattern being generated at a separate phase angle. Preferably, the phase shifted patterns are separated by 120 degrees ($2\pi/3$). Where $\Delta_1$, $\Delta_2$, and $\Delta_3$ represent the separate phase angles, the intensity of each pixel in the three patterns can be represented as follows:

$$I_1(x,y) = I'(x,y) + I''(x,y) \cos [\phi(x,y) + \Delta_1] \quad (1)$$

$$I_2(x,y) = I'(x,y) + I''(x,y) \cos [\phi(x,y) + \Delta_2] \quad (2)$$

$$I_3(x,y) = I'(x,y) + I''(x,y) \cos [\phi(x,y) + \Delta_3] \quad (3)$$

where I'(x,y) is the average intensity, I''(x,y) is the intensity modulation, and $\phi(x,y)$ is the phase to be determined. Solving the above three equations simultaneously for $\phi(x,y)$ yields the following solution:

$$\tan\phi(x, y) = \frac{(I_3 - I_2)\cos\Delta_1 + (I_1 - I_3)\cos\Delta_2 + (I_2 - I_1)\cos\Delta_3}{(I_3 - I_2)\sin\Delta_1 + (I_1 - I_3)\sin\Delta_2 + (I_2 - I_1)\sin\Delta_3} \quad (4A)$$

By using phase shifts, $\Delta$, of 120 degrees with $\Delta_1 = -120$, $\Delta_2 = 0$, and $\Delta_3 = 120$, the equation reduces down to:

$$\phi(x, y) = \tan^{-1}\left(\sqrt{3} \frac{I_1 - I_3}{2I_2 - I_1 - I_3}\right) \quad (4B)$$

With the signs of ($I_1-I_3$) and ($2I_2-I_1-I_3$) known, the above equation provides the so-called modulo $2\pi$ phase at each pixel with values between 0 and $2\pi$. Once $\phi(x,y)$ for each pixel is determined, a saw-tooth-like phase-wrapped image can be generated with the highest gray level corresponding to the phase of $2\pi$ and the lowest to 0, More than three phase shifted patterns can be generated and used in determining φ(x,y) for each pixel which generally translates into higher accuracy. However, the trade-off is longer processing time both in image retrieval and processing. In addition, the average intensity I'(x,y), intensity modulation I"(x,y), and data modulation γ(x,y) can also be derived as follows:

$$I'(x, y) = \frac{I_1 + I_3 + I_2}{3}, \quad (5)$$

$$I''(x, y) = \frac{[3(I_1 + I_3)^2 + (2I_2 - I_1 - I_3)^2]^{\frac{1}{2}}}{3}, 20 \quad (6)$$

$$\gamma(x, y) = \frac{I''(x, y)}{I'(x, y)} = \frac{[3(I_1 - I_3)^2 + (2I_2 - I_1 - I_3)^2]^{\frac{1}{2}}}{I_1 + I_2 + I_3} \quad (7)$$

The Data modulation γ(x,y) can be used to check the quality of data at each pixel. A data modulation near one is good, whereas a data modulation near zero is bad meaning the fringes are washed out, saturated, out of focus, etc. Alternatively, the solutions for Equations (1) through (3) for the phase, the average intensity, intensity modulation, and data modulation can be determined by Fourier coefficients as suggested in U.S. Pat. No. 3,694,088 to Gallagher et al., the disclosure of which has been previously incorporated herein by reference.

The image generator 22 extracts the height information from the phase-wrapped image using a standard phase unwrapping algorithm. There are a variety of algorithms that are well known in the art for unwrapping the phase-wrapped image. General methods for unwrapping the phase-wrapped image are described in "Phase Shifting Interferometry," in Optical Shop Testing, by J. E. Greivenkamp and J. H. Bruning, 2d Ed., Daniel Malacara, John Wiley & Sons (1992) at pages 551–553, In addition, U.S. Pat. No. 5,307, 152 to Boehnlein et al., the disclosure of which is incorporated herein by reference, discloses an algorithm (Col. 7, line 7 through Col. 8, line 43) for unwrapping a phase-wrapped image that was generated with Equation (4A) with phase shifts of 90 degrees.

In experimentation conducted by the inventors, the 2π discontinuity is first removed horizontally as follows:

$$f_x(x,y)=\phi(x,y)+2\pi k. \quad (8)$$

where k is the number of 2π's that needs to be added in order to remove the discontinuity. The number k can be positive or negative depending on the geometry of the surface. The application of Equation (8) to the phase-wrapped image provides a series of horizontal surface profiles that are not height related. In order to form a continuous surface, the height relations of the horizontal surface profiles needs to be determined. Assuming that the pixel number is M×N, this is accomplished by removing the 2π discontinuity vertically for the middle column as follows:

$$f_y(M/2,y)=\phi(M/2,y)+2\pi l, \quad (9)$$

where l is the number of 2π's that need to be added in order to remove the discontinuity vertically. The middle column vertical profile provides the height relations for the series of horizontal profiles generated by Equation (8). The final surface contour can be obtained by the following equation:

$$f(x,y)=[f_x(x,y)-f_x(M/2,y)-s_x x]+[f_y(M/2,y)-f_y(M/2,N/2)-s_y y], \quad (10)$$

where $$s_x=[f_x(M,N/2)-f_x(0,N/2)]/M, \quad (11)$$

$$s_y=[f_y(M/2,N)-f_y(M/2,0)]/N, \quad (12)$$

are the slopes of the middle row and the middle column respectively. The slopes are included in the equation to remove the tilt of the surface contour.

The above algorithm is premised upon the object occupying the entire image.

Figure 7:
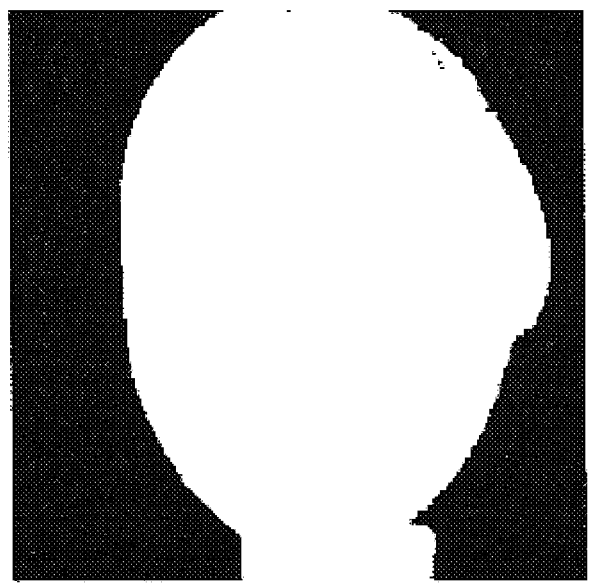
FIG. 7 is a view showing a mask generated to remove noise in the background of the phase-wrapped image.

If the object occupies only part of the image as shown in FIG. 6A, 6B, and 6C, then a mask is generated to define the boundaries of the object removing the noise in the background as shown in FIG. 7. The mask in FIG. 7 was generated by taking the average of the three reflected phase shifted fringe patterns and binarizing the average at a gray level of 20, The algorithm is modified to do phase unwrapping only within the boundaries of the object.

The operation of the embodiment of the invention shown in FIG. 1 along with a method of the invention will now be described in detail with reference to FIGS. 6A, 6B, 6C, 7 and 8 which illustrate the reconstruction of a dummy face. Initially, digitally-interpretable fringe pattern signal is generated with the signal generator 16, The signal is converted into an optical phase shifted fringe pattern and projected onto the surface 14 of the object 12 being imaged as shown in FIG. 6A. The fringe pattern is distorted by the geometry of the object and the reflection of this distorted fringe pattern is retrieved by the optical retrieval device 20 which forwards the reflection to the image generator 22, The phase angle is shifted after the optical retrieval device 20 retrieves the reflection and the process is repeated. Generally, when the three-step algorithm described above is used, a total of three phase shifted signals are generated. The phase angles of FIGS. 6A, 6B, and 6C are separated by 120 degrees. The image generator 22 combines the distorted fringe patterns to generate a phase-wrapped image as shown in FIG. 8 by extracting the phase of each pixel of the image as described above. In generating the phase-wrapped image shown in FIG. 8 noise in the background was removed by masking the boundaries of the object as shown in FIG. 7. Once the phase-wrapped image is generated, the image generator 22 reconstructs the surface 14 of the object 12 by unwrapping the phase-wrapped image.

In an alternative embodiment of the invention, the phase shifted fringe patterns are color encoded and projected substantially simultaneously. The inventors' initial experimentation using color encoding is described in SPIE Proceedings Vol. 3407, Paper No.: 3407–66, pp.477482 entitled "Color-encoded fringe projection and phase shifting for 3D surface contouring" published on Sep. 29,1998, the disclosure of which is incorporated herein by reference. This embodiment of the invention will be explained with reference to FIGS. 10 through 13, which show images that were generated in reconstructing the three dimensional surface contour of a plaster sculpture of a head.

Referring now to FIGS. 1, in this embodiment the signal generator 16 generates substantially simultaneously a plurality of phase shifted digitally-interpretable fringe pattern signals that are color encoded. When the three step algorithm is used for phase wrapping, preferably three signals are generated. The signals are encoded with information so that the optical fringe patterns are phase shifted by 120 degrees with each one having a separate color, e.g., red, green, and blue. Essentially, the signal generator 16 generates a signal containing the information of three phase shifted patterns superimposed, but color encoded for identifying the separate phase shifts for image reconstruction.

Figure 10:
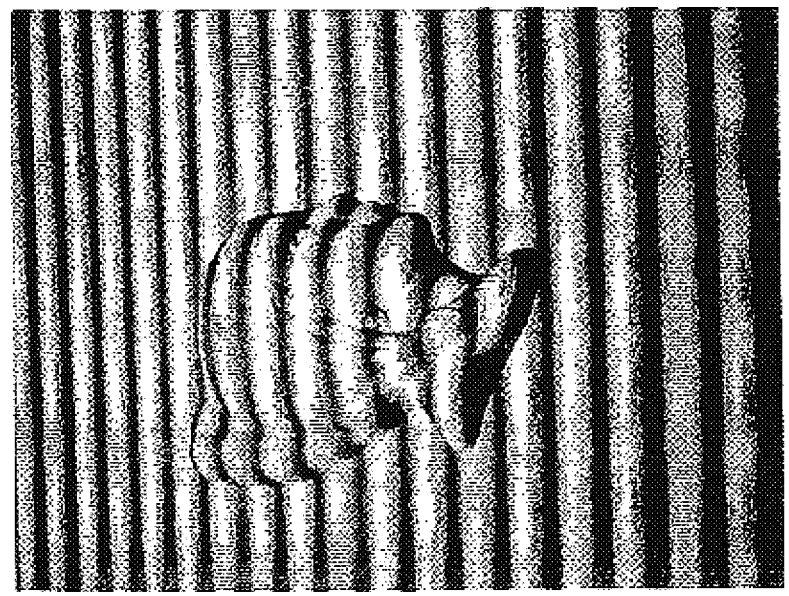
FIG. 10 is a view showing a color encoded fringe pattern being projected on a plaster head sculpture.

The digital video projector 18 receives the superimposed color encoded signal and converts the signal into a color encoded optical fringe pattern and projects it onto the surface 14 of the object as shown in FIG. 10. The fringe pattern shown in FIG. 10 includes the three phase shifted components shown in FIGS. 11A, 11B, and 11C. In using digital video projectors that are currently commercially available, color can be added by three different mechanisms. Where a projector has only one DMD chip as described above with reference to FIG. 5, the color is added by the use of a rotating RGB color wheel. In projectors that have two DMD chips, one chip is dedicated to red and the other chip to green and blue. A color wheel with yellow and magenta filters is used to provide a continuous red beam and an alternating green and blue beam. In three-chip projectors, a DMD chip is dedicated for red, green, and blue. As expected the three-chip system provides the best light efficiency, but is also the most expensive. When using a three-chip projector the three phase shifted components shown in FIGS. 11A, 11B, and 11C can truly be projected simultaneously. When using a single-chip projector that uses the rotating color wheel, the three phase shifted components are also projected simultaneously with each component being intermittently projected. The intermittent projection is dependent upon the location of the rotating color wheel with respect to the light being passed therethrough.

When using color encoded fringe patterns, the optical retrieval device 20 is a color camera. Preferably, the optical retrieval device 20 is a three-CCD color video camera providing high resolution because each CCD can be dedicated to one color channel. The optical retrieval device retrieves the reflection of the optical fringe pattern shown in FIG. 10. In the inventors' experimentation, a digital camera from Kodak (Model DC210) which has 1152×864 pixels was used. The camera has a color CCD sensor that produces color images based on a filter array technique that has 50% of the pixels filtered for green and 25% each for red and blue. There are more pixels filtered for green than those for red and blue because human eyes are most sensitive to green. The reflections retrieved by the camera were transferred to an image generator 22 using Kodak's Easy Picture software.

Figure 11A:
FIG. 11A is a view showing the red channel of the color encoded fringe pattern shown in FIG. 10 having a phase angle of −120 degrees.
Figure 11C:
FIG. 11C is a view showing the blue channel of the color encoded fringe pattern shown in FIG. 10 having a phase angle of 120 degrees.
Figure 11B:
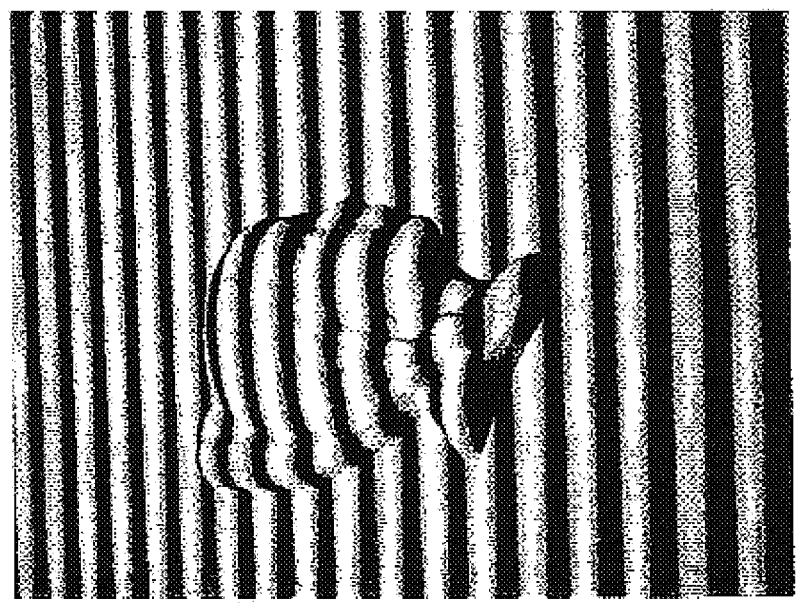
FIG. 11B is a view showing the green channel of the color encoded fringe pattern shown in FIG. 10 having a phase angle of 0 degrees.

The image generator 22 first separates the reflection shown in FIG. 10 into its RGB components as shown in FIGS. 11A, 11B, and 11C. After the RGB components are acquired, the RGB components are combined through the standard phase wrapping and unwrapping algorithms described above, but with modifications for color coupling and color intensity as discussed below. In the inventors' experimentation, Aldus PhotoStyler image processing software was used to separate the RGB components of the reflection. The modifications discussed below relate to the specific experiments conducted by the inventors. As the discussion will highlight, those skilled in the art will understand that similar modifications may be necessary, but will depend upon the specific application of the invention.

Since the color encoding technique requires that the reflection be separated into RGB components, the outcome of contouring is dependent upon the quality of the separation. Generally in all color cameras, the spectra of red, green, and blue channels are usually made to have some overlaps so that there will be no color-blind areas on the spectrum. This implies that the complete separation of the three phase shifted fringe patterns is not likely. However, since the degrees of overlaps are fixed, compensation for the coupling effects can be done after the image has been taken. Experiments were conducted to find the degree of coupling effects between the three color channels. The target used for this experiment was a flat, white-painted foam board. Purely red, green, and blue fringe patterns were projected in sequence. For each color, three phase shifted images ($-2\pi/3$, 0, $2\pi/3$) were taken which resulted in a total of nine images. The images were then separated into their RGB components, which resulted in a total of 27 images. From these images, the intensity modulation I"(x,y) was calculated according to Equation (6) for each set of the phase-shifted images. The ratios of I"(x,y) values between channels indicated the degree of coupling effects between these channels. It was determined that there was a strong coupling effect between the red and green channels, but a much weaker one between the green and blue channels. The strong coupling effect between the red and green channels cannot be attributed to the overlap of spectra of the two colors alone. Color distortion by the projector and the camera may have caused the major part of it because when comparing the red or green fringe pattern projected on the object and with that on a video monitor, a difference in color was noted. To compensate for this coupling effect, the following equations were used to calculate the compensated intensities:

$$I_{rc}(x,y) = [I_r(x,y) - aI_g(x,y)]/(1-ab) + c. \quad (13)$$

$$I_{gc}(x,y) = [I_g(x,y) - bI_r(x,y)]/(1-ab) + c. \quad (14)$$

$$I_{bc}(x,y) = I_b(x,y) + c. \quad (15)$$

where $I_r(x,y)$, $I_g(x,y)$ and $I_b(x,y)$ are the original intensities and $I_{rc}(x,y)$, $I_{gc}(x,y)$, and $I_{bc}(x,y)$ are the compensated intensities for the red, green, and blue channels, respectively, a and b represent coupling effect between the red and green channels, and c is the offset that is necessary to keep the intensity values between 0 and 255. The coupling effect between the green and blue channels was ignored. Experimental results showed that this compensation scheme reduced the errors caused by the coupling effect significantly.

In addition to the coupling effects between the color channels, a correction for an intensity imbalance between the images of the red, green, and blue fringe patterns may be required. In the experimentation, red was the weakest and green was the strongest. Since the input intensities for the three colors were the same (255 levels), this imbalance was caused mostly by the digital video projector, which used a metal halide lamp that is red-light deficient. To compensate for this imbalance, the amplitudes of the fringe patterns for the three colors was adjusted. It was determined that changing the amplitude for the green and blue colors to 210 and keeping the amplitude for the red color at 255 produced the best results.

Figure 13:
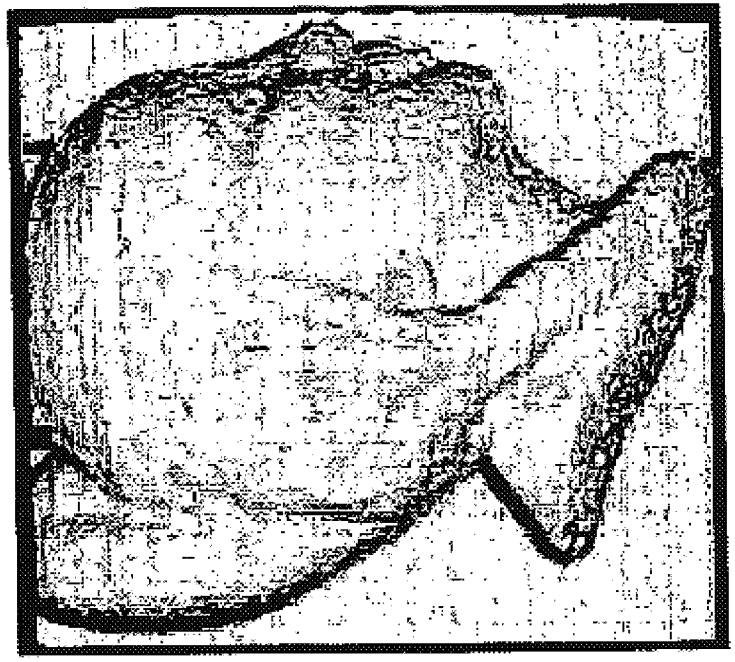
FIG. 13 is a view showing a reconstructed surface of the plaster head sculpture shown in FIGS. 11A, 11B, and 11C.
Figure 12:
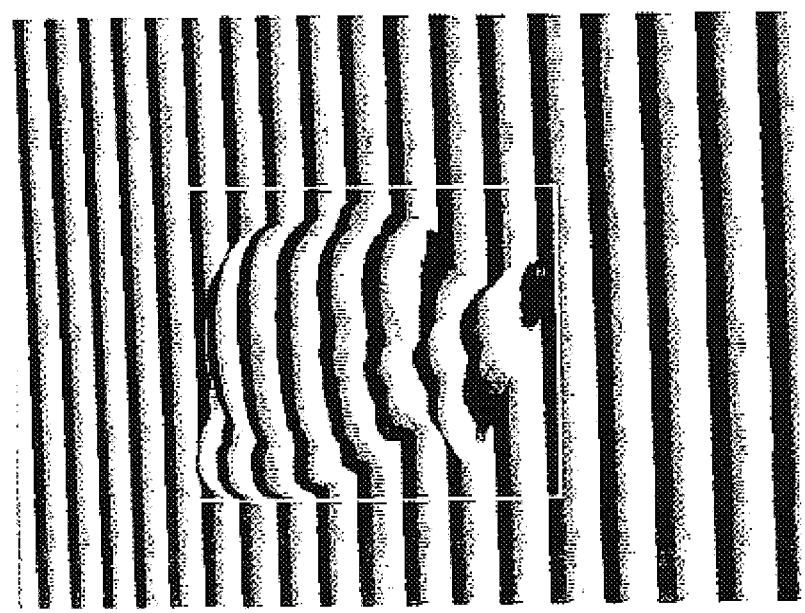
FIG. 12 is a view showing a phase-wrapped image generated from the information contained in FIGS. 11A, 11B, and 11C.

In summary, when color encoding is used, only one reflection of the object is required to obtain its three dimensional contour thus increasing contouring speed. FIG. 10 shows the reflection of the color encoded optical fringe pattern wherein the amplitudes for the three colors are adjusted as described above. FIGS. 11A, 11B, and 11C show the three phase shifted RGB components extracted from FIG. 10 before compensation for the coupling effect. FIG. 12 shows the phase-wrapped image that was generated after compensation for coupling effects, and FIG. 13 shows the reconstructed 3-D image of the object that was only unwrapped in the area enclosed in the central rectangle shown in FIG. 12.

In another embodiment of the invention, the sequential projection of the phase shifted fringe patterns are synchronized to increase contouring speed. To accomplish the synchronization the apparatus of the invention as shown in FIG. 1 further comprises a synchronizing link 48 which connects the signal generator 16 to the image generator 22. The synchronizing link 48 can simply be a connection that provides for the coordination between the initial generation of the digitally-interpretable fringe pattern signal and the retrieval of the reflection of each distorted fringe pattern. This connection can be either software based or be embedded in the circuitry of either the signal generator 16 or the image generator 22, Alternatively, a unique operating principle of a single DMD chip digital projector 18 as shown in FIG. 5 can be used to control the synchronization. Initially a plurality of phase shifted digitally-interpretable fringe pattern signals that are color encoded are generated by the signal generator 16, When sent to the digital projector 18, the RGB components of this color encoded fringe pattern signal will be projected sequentially and repeatedly at a frequency of 60 Hz. Referring again to FIG. 5, if the color wheel 42 of the projector is disengaged, the ROB components of the fringe pattern will actually be projected in grayscale. By synchronizing image retrieval with the projection of these three component fringe patterns, three phase-shifted images of the object can be taken in a very short period, thus boosting up the three dimensional imaging speed significantly. Hardware based image processing and graphics display can also be used to increase the speed of three dimensional reconstruction so that three dimensional imaging at the video rate (30 frames/sec) can be realized.

The present invention also contemplates that the image generator 22 can be connected to or include an output device for the display or further consideration of the imaging results. More specifically, the output device can include a video monitor or printer for simply displaying the results of the imaging. On the other hand, in quality control applications where the invention is used for the inspection of industrial parts whose parts need to be checked against their design specifications during or after manufacturing, the image can be compared against a mathematical model of the standard part to determine whether there are any defects in the manufactured part. In addition, when an industrial part is determined to have defects the image generator 22 can be linked to the signal generator 16 to generate a signal so that the digital video projector 18 projects information concerning defects. The information concerning the defects can include for example the nature, severity, and area of the defects. The information can also be projected in a variety of ways including: projecting the location of the defects on the part that is being imaged; projecting text describing the defects; projecting colors on the surface of the object; and projecting icons that have a meaning defined by the user. A specific example where the invention can be used for inspection purposes is in the sheet metal manufacturing industry. The invention can also be used in the assembling processes of sheet metal parts which are clamped at various positions. Wrong clamping positions can cause large deformations in the sheet metal parts. With the present invention, the deformation of the sheet metal part can be inspected quickly after clamping and the results can be projected on to the sheet metal surface. The clamping positions can then be adjusted until optimal positions are located.

In another embodiment of the invention, the optical projected fringe patterns are optimized to improve surface contouring. In surface contouring by moiré interferometry or fringe projection the resolution is generally dependent upon fringe spacing and contrast in the fringe pattern reflected from the object surface. Since fringe spacing and contrast in the reflected fringe pattern depend on the slope and reflectivity of the surface of the object, the spacing and contrast of the projected fringe pattern should be optimized based on the condition of the surface in order to achieve optimized contouring results. In traditional methods, the spacing and contrast are assigned one value for the entire surface that is being imaged. With the present invention, the object being imaged can be initially reconstructed as described above.

The image generator 22 then determines the optimal fringe spacing and contrast based upon the initial reconstructed image and through a link to the signal generator 16 adjusts the fringe pattern signal accordingly. A second reconstructed image is then obtained using the adjusted fringe pattern signal. In another embodiment, the image generator 22 first divides the reconstructed image into a plurality of separate areas with each area being characterized in that it requires a similar fringe pattern for optimal surface contouring. The image generator 22 then assigns each area its optimal fringe spacing and contrast. A second reconstructed image is obtained as described above. In an alternative embodiment, the image generator 22 first generates a duplicate of the reconstructed image. The reconstructed image is divided into a plurality of separate areas with each area being characterized in that it requires a similar fringe spacing for optimal surface contouring. The duplicate of the reconstructed image is divided into a plurality of separate areas with each area being characterized in that it requires a similar fringe contrast for optimal surface contouring. The image generator 22 then superimposes the results to assign the entire surface both its optimal fringe spacing and contrast. A second reconstructed image is obtained as described above. The optimizing steps in all embodiments can be repeated as required, but it is expected that only one iteration is necessary for most applications.

In another embodiment of the invention, the fringe pattern is ordered to address the problems associated with discontinuities in the surface of the object. In one method, prior to projecting the fringe patterns, a single fringe is digitally projected and scanned through the surface of the object. While scanning, a plurality of reflected images are retrieved to locate the position of areas with discontinuous features. The reconstruction of the surface is then done in accordance with the invention as described above, but with one fringe encoded with a different color or intensity running through each area identified as having a discontinuous feature. The encoded fringe is now used to reference fringes from which the remaining fringes are ordered. The additional information known from the fringe order is used in phase unwrapping to correctly reconstruct any discontinuous features in the surface of the object. In an alternative method, all of the fringes of the fringe pattern are color encoded with a plurality of different colors forming a fringe pattern that is similar to a rainbow. The rainbow pattern can be periodically repeated at a sufficient spacing to insure that there is no overlapping of similar colors. Each fringe can now be ordered on the basis of its rainbow color profile so that any discontinuous features in the surface of the object can be correctly reconstructed during phase unwrapping.

In another method for addressing the problems associated with discontinuities in the surface of the object, a first surface contour is initially extracted by triangulation as known in the art from a plurality of reflected images acquired by projecting and; scanning a single fringe through the surface of the object. Since only one image exists in each image, there is no fringe order confusion nor modulo $2\pi$ ambiguity problem. The surface contour obtained through triangulation is correct, but the tradeoff is that it provides low resolution. A second surface contour is now obtained using the phase shifting method which provides a high resolution of the surface contour but cannot extract the correct height information at surface discontinuities. Once both surface contours are obtained the image generator combines the information from both images to provide a surface contour having high resolution and correct height information at discontinuities.

In another embodiment of the invention, the signal generator 16 is configured to generate a plurality of digitally-interpretable signals so that the digital video projector 18 projects a plurality of spots or cross-hairs at various points on the surface of the object for determining range information. To determine the range information, initially at least three spots or cross-hairs are projected onto separate points on the object. The spots or the centers of the cross-hairs are retrieved by the optical retrieval device 20 and using the principles of triangulation the distance to each point is determined by the image generator 22, The distance information of at least three points on the surface combined with the surface shape obtained by the phase shifting method uniquely determines the absolute position, orientation, and shape of the object surface in space. This measurement of absolute position, orientation, and shape is useful, for example, in providing 360-degree measurement of object surface where patches of object surface measured at different angles need to be connected to form a seamless 360-degree shape.

In an alternative embodiment of the invention, the absolute phase map of the object is initially obtained by determining the absolute phase for at least one pixel. The absolute phase map is then converted to absolute coordinates of the surface of the object surface by a transformation algorithm. The inventors' initial experimentation was first published in a paper entitled "Calibration of a 3D Surface Contouring and Ranging System," Proc. SPIE Vol. 3835, Three-Dimensional Imaging, Optical Metrology, and Inspection V, Kevin G. Harding; Ed., 158–166 (Boston, Mass., 1999), the disclosure of which is incorporated herein by reference. The remaining discussion focuses on this aspect of the invention. Towards that end the nomenclature that is used in the formulas refers to the illustrations in FIGS. 14 through 16 and 18(c). In particular, i and j have been adopted for referencing pixels in lieu of x and y as discussed above because x, y, and z are now used to describe coordinate systems as discussed below.

Any pixel in the captured image of the object corresponds to a unique point on the object and a unique point on the DMD. To find the coordinates of this unique point on the object surface through triangulation, the corresponding point on the DMD needs to be located first. One way of finding this correlation is to generate an absolute phase map. Absolute phase of any pixel is the phase of its corresponding point on the DMD measured from its left-most edge. Once the absolute phase map is determined, every pixel can be correlated to a specific point on the DMD. The phase map $\Phi((i,j)$ as determined by the traditional phase unwrapping algorithm provides only a relative phase map because the absolute phase of the starting point of the unwrapping process cannot be determined. To determine the absolute phase map, an absolute phase mark signal is generated by the signal generator 16 which is then converted and projected as an absolute phase mark by the digital video projector 18 onto the surface of the object. This absolute phase mark, which is at least a point, is used to determine the absolute phase of at least one pixel in the relative phase map. The absolute phase map of the entire object surface can then be determined by simply translating the relative phase map. If the absolute phase of the absolute phase mark is $\Phi_0$ and the relative phase of its corresponding pixel in the relative phase map is $\Phi(i_1,j_1)$, the absolute phase map $\Phi'(i,j)$ can be obtained as follows:

$$\Phi'(i,j)=\Phi(i,j)+\Phi_0-\Phi(i_1,j_1) \tag{16}$$

Preferably the absolute phase mark is a line of pixels projected at substantially the center of the surface of the object. The line is preferably projected parallel to the optical fringe patterns. From the reflection of the absolute phase mark retrieved by the optical retrieval device 20, the pixels corresponding to the line can be identified. Since any point on the line in the absolute phase mark has the same absolute phase, the identified pixels in the relative phase mark should all have the same absolute phase. Therefore, the absolute phase map for the entire surface $\Phi'(i,j)$ can be obtained as follows:

$$\Phi'(i,j) = \Phi(i,j) + \Phi_0 - \frac{1}{N}\sum_{k=1}^{N}\Phi_k \tag{17}$$

where $\Phi_k$'s are the phases of the pixels in the relative phase map that correspond to the line of the absolute phase mark and N is the total number of such pixels. A more accurate absolute phase map is obtained by using a line as an absolute phase mark because the average of the phase values at multiple pixels is used in the calculation. Preferably absolute phase mark is projected simultaneously with at least one of the fringe patterns. Most preferably, the absolute phase mark is color encoded when being projected simultaneously with at least one of the fringe patterns. In addition, any number of points or lines or a combination of them can be projected and used to obtain the absolute phase map of the surface. The translation of the relative phase map is done by using fitting methods known in the art.

Once the absolute phase map is determined, the image generator 22 transforms the absolute phase map into coordinates of the surface of the object. The image generator 22 is configured with a transformation algorithm to perform this task. The balance of the discussion discloses a transformation algorithm that is suitable for use in connection with the present invention and a method of calibrating the present invention.

Figure 14:
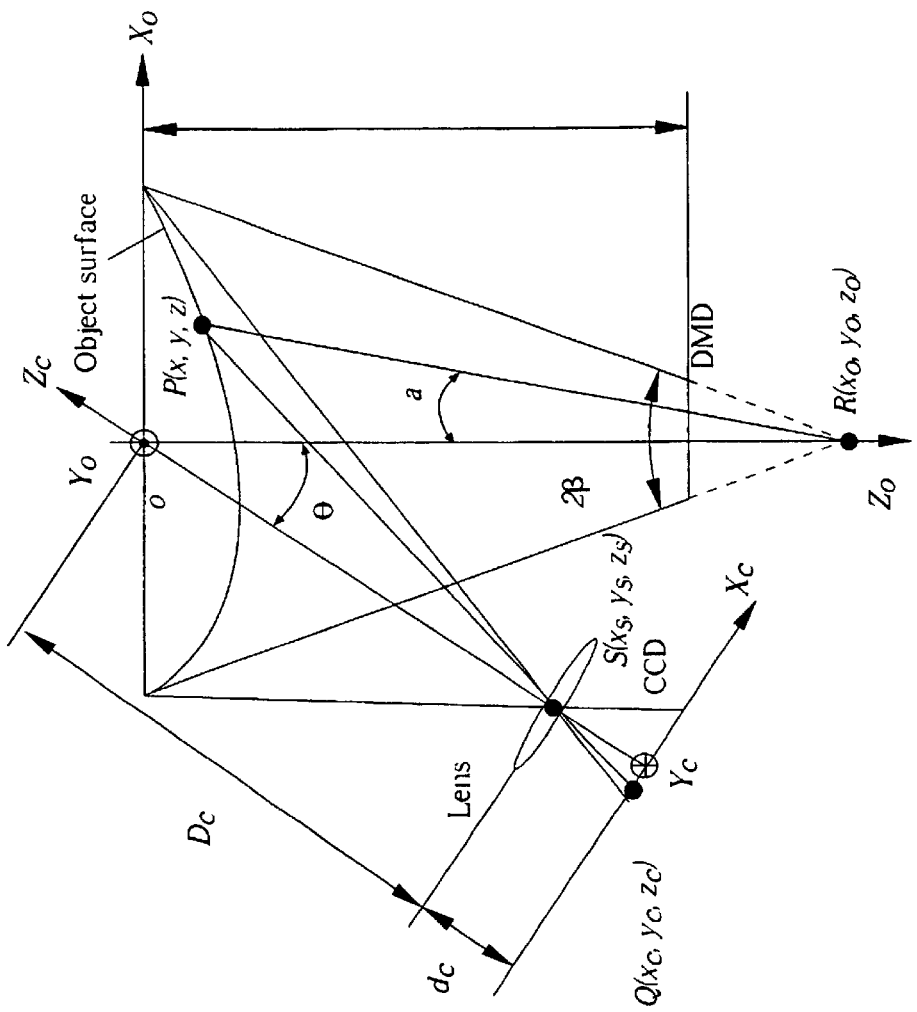
FIG. 14 is a schematic diagram of the present invention illustrating coordinate system.

Referring now to FIG. 14, a diagram of the system layout and the coordinate systems is shown. Consider an arbitrary image point Q on the CCD sensor. Its coordinates in the $X_cY_cZ_c$ coordinate system are $$(x_c,y_c,z_c)=(0.009(i-i_0),0.009(j-j_0),0) \tag{18}$$

where 0.009 is the pixel size of the camera in mm, $(i_0,j_0)$ is the position of the origin of the $X_cY_cZ_c$ coordinate system. The coordinates of the camera lens center S in the same coordinate system are $$(x_s,y_s,z_s)=(0,0,d_c) \tag{19}$$

From the absolute phase $\Phi'(i,j)$ of point Q, the corresponding line on the DMD chip can be identified. This line and the converging point of the projection field R defines a plane of light PP with the same phase as that of point Q. The corresponding point of Q on the object surface P must lie in this plane. On the other hand, points P, Q, and S should be on the same line. Therefore, point P can be determined as the intersection point of the plane PP and the line QS.

The line QS and plane PP can be easily defined in coordinate systems $X_cY_cZ_c$ and $X_oY_oZ_o$ respectively.

However, they must be described in the same coordinate system in order to find the solution for the coordinates of point P. Therefore, coordinate transformation between the two coordinate systems is necessary. For simplicity, we choose to transform the coordinates of points Q and S to $X_o Y_o Z_o$. Following are the three transformation matrices:

$$T = \begin{bmatrix} 1 & 0 & 0 & 0 \\ 0 & 1 & 0 & 0 \\ 0 & 0 & 1 & -(D_c + d_c) \\ 0 & 0 & 0 & 1 \end{bmatrix}, \quad (20)$$

$$R_2 = \begin{bmatrix} 1 & 0 & 0 & 0 \\ 0 & -1 & 0 & 0 \\ 0 & 0 & -1 & 0 \\ 0 & 0 & 0 & 1 \end{bmatrix}, \quad R_1 = \begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix}.$$

Let the coordinates of points Q and S in $X_o Y_o Z_o$ be $(x_c', y_c', z_c')$ and $(x_s', y_s', z_s')$ respectively. We have $$\begin{bmatrix} x_c' \\ y_c' \\ z_c' \\ 1 \end{bmatrix} = R_2 R_1 T \begin{bmatrix} x_c \\ y_c \\ z_c \\ 1 \end{bmatrix}, \quad \begin{bmatrix} x_s' \\ y_s' \\ z_s' \\ 1 \end{bmatrix} = R_2 R_1 T \begin{bmatrix} x_s \\ y_s \\ z_s \\ 1 \end{bmatrix}. \quad (21)$$

The equation of QS in $X_o Y_o Z_o$ is then $$\frac{x - x_c'}{x_s' - x_c'} = \frac{y - y_c'}{y_s' - y_c'} = \frac{z - z_c'}{z_s' - z_c'}. \quad (22)$$

To find the equation for the plane PP in $X_o Y_o Z_o$ the position of the corresponding line of point Q on the DMD needs to be determined first. Since the phase of the line is $\Phi'(i,j)$, its position $x_p$ can be calculated from the following equation:

$$x_p = \frac{0.017 p \Phi'(i,j)}{2\pi} - 6.8. \quad (23)$$

Here we have used the fact that the size of the DMD pixel is 0.017×0.017 mm and the size of the whole DMD chip is 13.6×10.2 mm. The tilting angle a of the plane PP relative to the $Z_0$ axis is $$\alpha = \arctan\left(\frac{x_p \tan\beta}{6.8}\right) \quad (24)$$

where β is half of the projection angle in the horizontal plane. The coordinates of the converging point of the projection field R are $$(x_0, y_0, z_0) = (0, 0, D_p + 6.8/\tan\beta). \quad (25)$$

The equation of PP can then be written as $$(x-x_0)\cos\alpha + (z-z_0)\sin\alpha = 0. \quad (26)$$

The coordinates of point P(x,y,z) can be determined by solving Equations (22) and (26) simultaneously. Following are the solutions:

$$x = \frac{x_s' - x_c'}{z_s' - z_c'}(z - z_c') + x_c', \quad (27)$$

$$y = \frac{y_s' - y_c'}{z_s' - z_c'}(z - z_c') + y_c', \quad (28)$$

$$z = \frac{(z_s' - z_c')[(x_0 - x_c')\cos\alpha + z_0 \sin\alpha] + z_c'(x_s' - x_c')\cos\alpha}{(x_s' - x_c')\cos\alpha + (z_s' - z_c')\sin\alpha}. \quad (29)$$

With the above transformation algorithm, the 3-D coordinates of every pixel in the phase map can be calculated, but only when the following system parameters are known:

θ: Angle between axes $Z_c$ and $Z_0$;

$D_c$: Distance between the lens and the origin of $X_o Y_o Z_o$;

$d_c$: Distance between the lens and the CCD sensor;

f: Focal length of the lens;

$D_p$: Distance between the DMD chip and the origin of $X_o Y_o Z_o$;

$(i_0, j_0)$: Position of the origin of $X_c Y_c Z_c$;

β: Half of the projection angle in the horizontal plane.

Of the above system parameters, DC and $d_c$ are related by the following equation:

$$d_c = \frac{D_c f}{D_c - f}. \quad (30)$$

Focal length of the camera lens f is fixed. The camera position can be adjusted so that $(i_0, j_0)$ are at the center of the CCD sensor. Therefore, there are only four independent parameters, θ, $D_c$, $D_p$ and β, that need to be determined.

The above system parameters cannot be measured directly with good accuracy. They have to be determined by indirect methods. In this research, we use a two-step approach to solve the problem. First, we indirectly measure the parameters to determine their approximate values. Second, we measure a calibration plate at different positions and then use an iterative algorithm to accurately estimate the parameters. The first step is necessary because it determines the approximate values of the parameters. Without these approximate values to begin with, the calculation may take an excessively long time and the algorithm may converge to wrong values.

Figure 15:
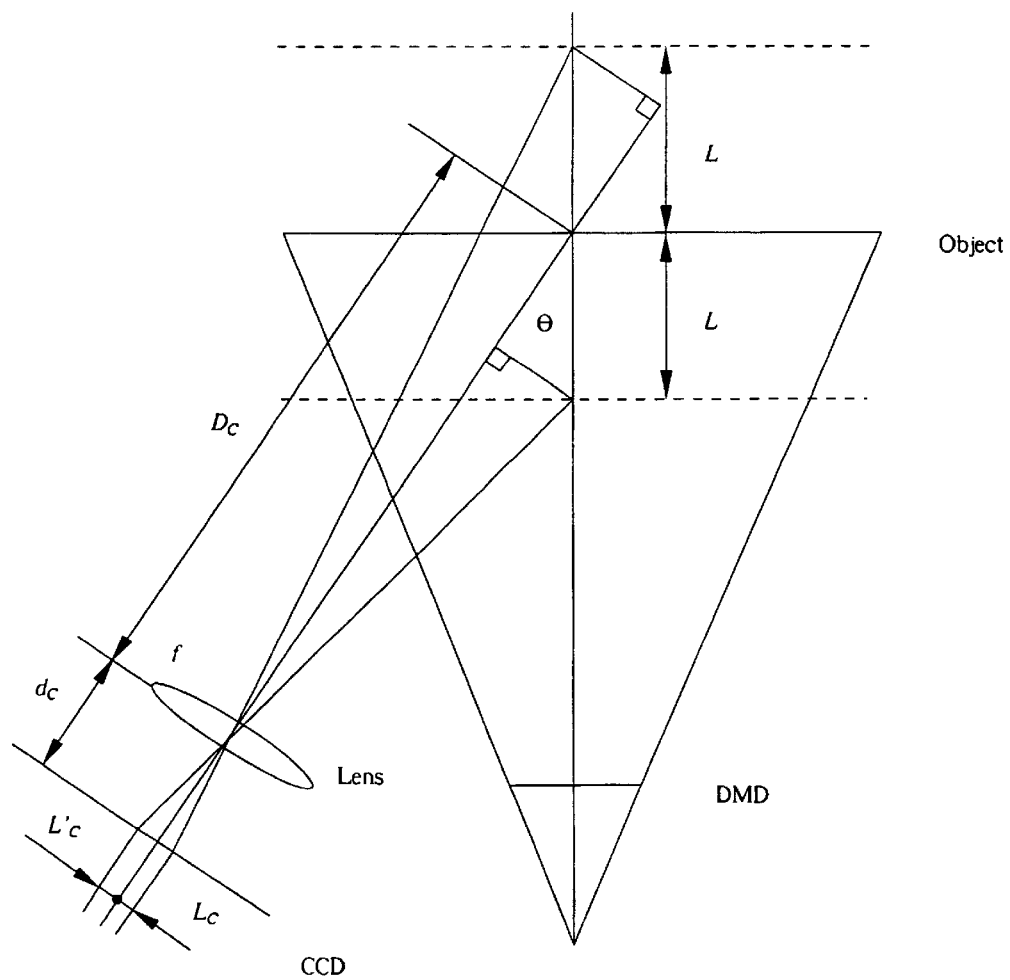
FIG. 15 is a schematic diagram showing a setup for measurement of parameters $D_c$ and $\theta$.

Referring now to FIG. 15, a setup for indirect measurement of the parameters $D_c$ and θ is shown. A spot at the center of the projection field is projected onto a flat plate that is mounted on a linear stage driven by a stepper motor. At first, the position of the plate is adjusted so that it passes through the point O or the origin of the $X_o Y_o Z_o$ coordinate system. Then the plate is translated by a distance of ±L. At each position, the image is recorded and the position of the spot on the CCD sensor is determined. From these positions, the corresponding image displacements $L_c'$, and $L_c$ can be calculated. These measured displacements are related to the system parameters as follows:

$$\frac{L\sin\theta}{D_c + L\cos\theta} = \frac{L_c}{d_c}, \quad (31)$$

$$\frac{L\sin\theta}{D_c - L\cos\theta} = \frac{L_c'}{d_c}. \quad (32)$$

Rearranging the above equations, we have $$D_c = \frac{L(L_c' + L_c)\cos\theta}{L_c' - L_c}, \quad (33)$$

-continued $$d_c = \frac{2L_c L'_c}{(L'_c - L_c)\tan\theta}. \quad (34)$$

Equations (33) and (34) together with Equation (30) can be solved for $D_c$, $d_c$, and $\theta$.

Figure 16:
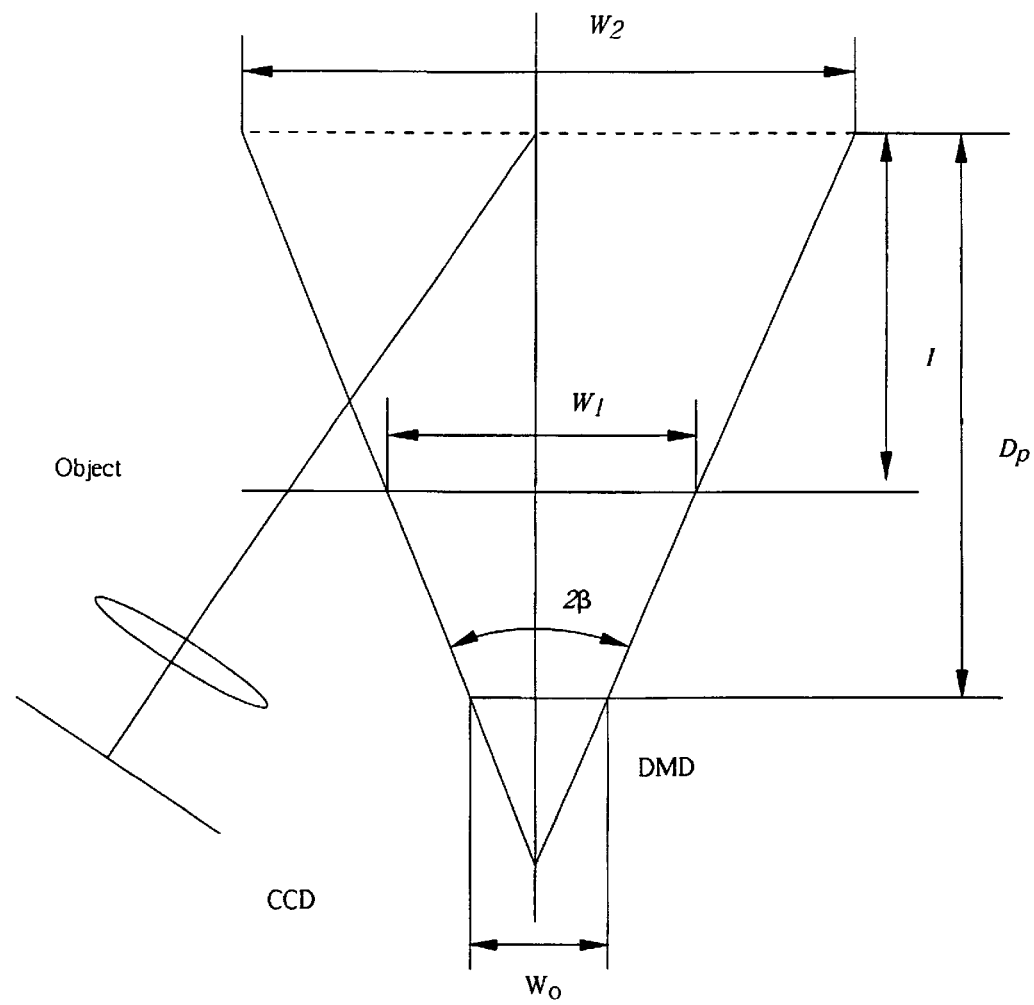
FIG. 16 is a schematic diagram showing a setup for measurement of parameters $D_p$ and $\beta$.

To find parameters $D_p$ and $\theta$, we use a setup shown in FIG. 16. A horizontal line extending from the left edge to the right edge of the projection field is projected. The plate is placed at two different positions. The lengths of the horizontal line at these two positions, $w_1$ and $w_2$, are measured as well as the distance between the two plate positions l, From these measurements, the parameters $D_p$ and $\beta$ can be calculated as follows:

$$D_p = \frac{w_2 - w_0}{\tan\beta}, \quad (35)$$

$$\beta = \tan^{-1}\left(\frac{w_2 - w_1}{2l}\right). \quad (36)$$

The experiments resulted in the following values for the four system parameters: $D_c$=1357.190 mm, $D_p$=934.037 mm, $\theta$=16.0.864°, and $\beta$=18.84°. The accuracy of these measured values may not be that high, but it is enough for them to serve as starting values for the iterative parameter estimation process described in the next section.

Figure 17:
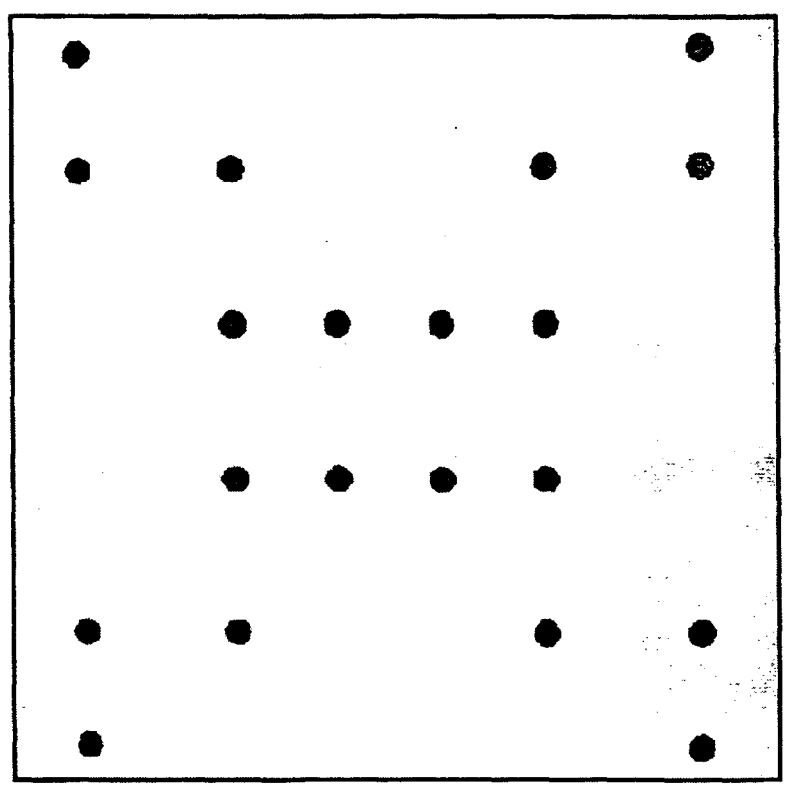
FIG. 17 is a view showing a calibration plate.

To determine the accurate values of the system parameters, we used a calibration plate, as illustrated in FIG. 17, as the measurement target. The plate is made of aluminum and is machined by a CNC milling machine. The surface is sprayed with white paint to improve its condition for measurement. The positions of the holes were calibrated by a coordinate measuring machine (CMM) (Brown & Sharpe MicroVal PFx). By measuring this calibration plate at different positions, calculating distances between various holes, and comparing the results with those obtained by the CMM, we can estimate the system parameters using an iterative algorithm.

First, the plate is placed at different positions with different tilting angles. At each position, the absolute phase map is obtained. Then the values of the system parameters are set to change in certain steps and in ranges centered on the values obtained from the indirect measurement. With each set of parameter values, the coordinates of the holes, and therefore the distances between the holes, are calculated. These distances are used to calculate the RMS error E of the measurement based on this particular set of parameter values. That is $$E = \sqrt{\frac{1}{mn}\sum_{i=1}^{m}\sum_{j=1}^{n}(L_{ij} - L_j)^2} \quad (37)$$

where $L_{ij}$ is the jth distance at the ith plate position measured by the system, $L_j$ is the jth distance measured by the CMM, and m and n are the numbers of plate positions and distances respectively. The set of best parameters that results in the minimum E values is selected to be the center values of these parameters for the next round of iterations. The step sizes and the ranges are reduced and the same process is repeated until the step size is small enough, for example, 0.001 mm for length parameters and 0.0001° for angle parameters. Then the iteration is stopped and the best parameters in the last round of iterations are used as the system parameters. In our experiment, we measured six distances between four holes at three plate positions or m=3 and n=6, which resulted in the minimum E of 0.251 mm. The estimated parameters were $D_c$=1193.190 mm, $D_p$=918.137 mm, $\theta$=13.789°, and $\beta$=18.768°. We also tried six distances at nice plate positions or m=9 and n=6, The resulting parameters were $D_c$=1193.434 mm, $D_p$=921.161 mm, $\theta$=13.8553°, and $\beta$=18.7049°. The minimum E in this case was 0.356 mm.

The calibration plate was used again to check the accuracy of the estimated system parameters. This time the plate was placed at six positions different from those used in the calibration. At each position, the coordinates of the holes or the distances between the holes were calculated by using the estimated system parameters. The results were compared with those obtained by the CMM and the differences were. recorded. Table 1 shows the results for all the six distances at each position of the calibration plate. The maximum error for each plate position is shown in bold face. The measured six distances by the CMM are also shown in the table. It can be seen that the largest error is −0.741 mm for distance $L_3$ and at the $4^{th}$ plate position.

TABLE 1

Distance measurement results.

| Pos. No. | | $L_1$ | $L_2$ | $L_3$ | $L_4$ | $L_5$ | $L_6$ |
|---|---|---|---|---|---|---|---|
| | CMM | 205.641 | 101.613 | 229.838 | 205.703 | 228.968 | 101.609 |
| 1 | Distance | 205.892 | 101.700 | 230.064 | 205.291 | 228.729 | 101.857 |
| | Error | −0.251 | −0.087 | −0.226 | 0.412 | 0.239 | −0.247 |
| 2 | Distance | 205.767 | 101.672 | 230.009 | 205.569 | 228.771 | 101.555 |
| | Error | −0.126 | −0.058 | −0.172 | 0.135 | 0.198 | 0.055 |
| 3 | Distance | 205.753 | 101.537 | 229.949 | 205.517 | 228.745 | 101.628 |
| | Error | −0.112 | 0.076 | −0.111 | 0.187 | 0.224 | −0.018 |
| 4 | Distance | 205.961 | 101.587 | 230.578 | 205.783 | 228.645 | 101.799 |
| | Error | −0.320 | 0.026 | −0.741 | −0.080 | 0.323 | −0.189 |
| 5 | Distance | 206.013 | 101.891 | 230.182 | 205.537 | 228.891 | 101.547 |
| | Error | −0.372 | −0.278 | −0.344 | 0.166 | 0.077 | 0.063 |
| 6 | Distance | 205.562 | 101.860 | 229.802 | 205.673 | 228.934 | 101.459 |
| | Error | .079 | −0.247 | 0.035 | 0.030 | 0.034 | 0.151 |

Figure 18A:
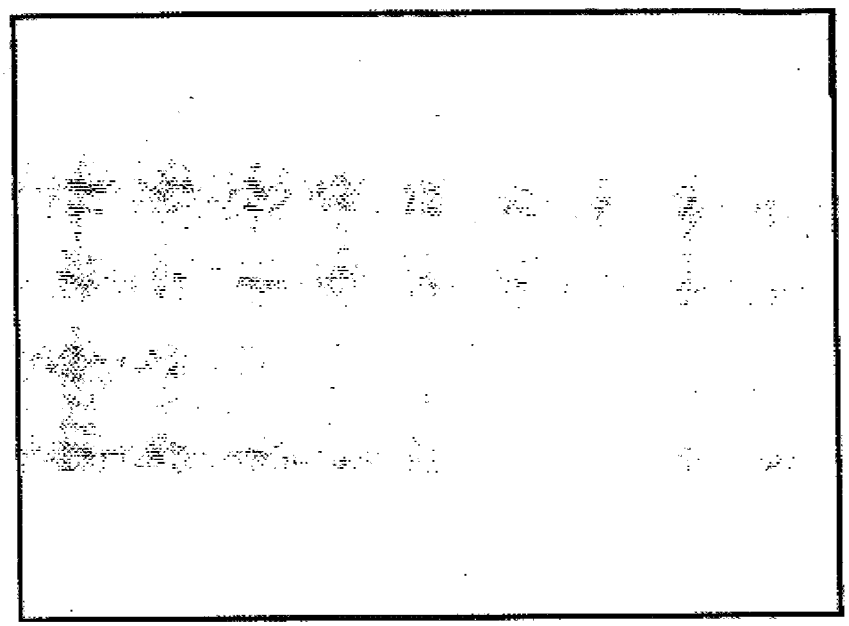
FIG. 18A is a view showing a two dimensional photograph of a sheet metal panel with a triangular shape.
Figure 18B:
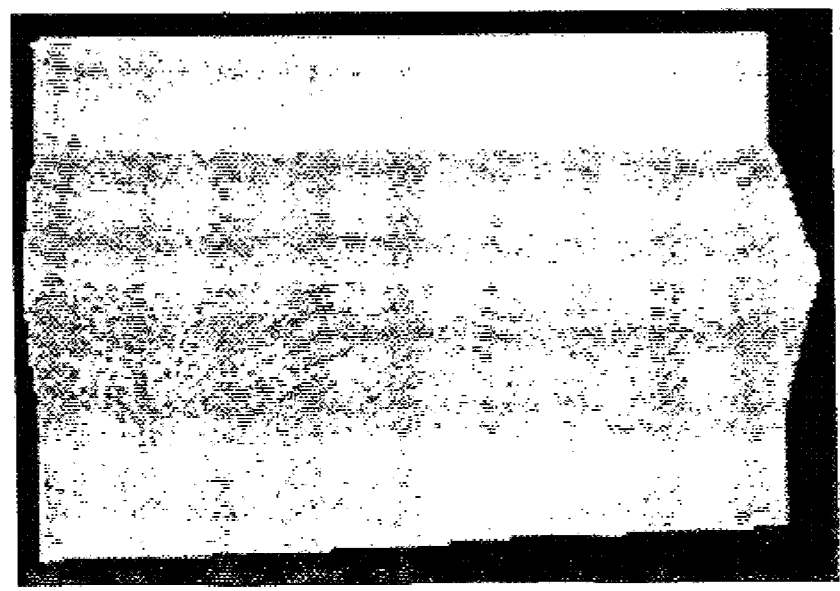
FIG. 18B is a view showing the reconstructed three dimensional surface contour of the panel shown in FIG. 18A.
Figure 18C:
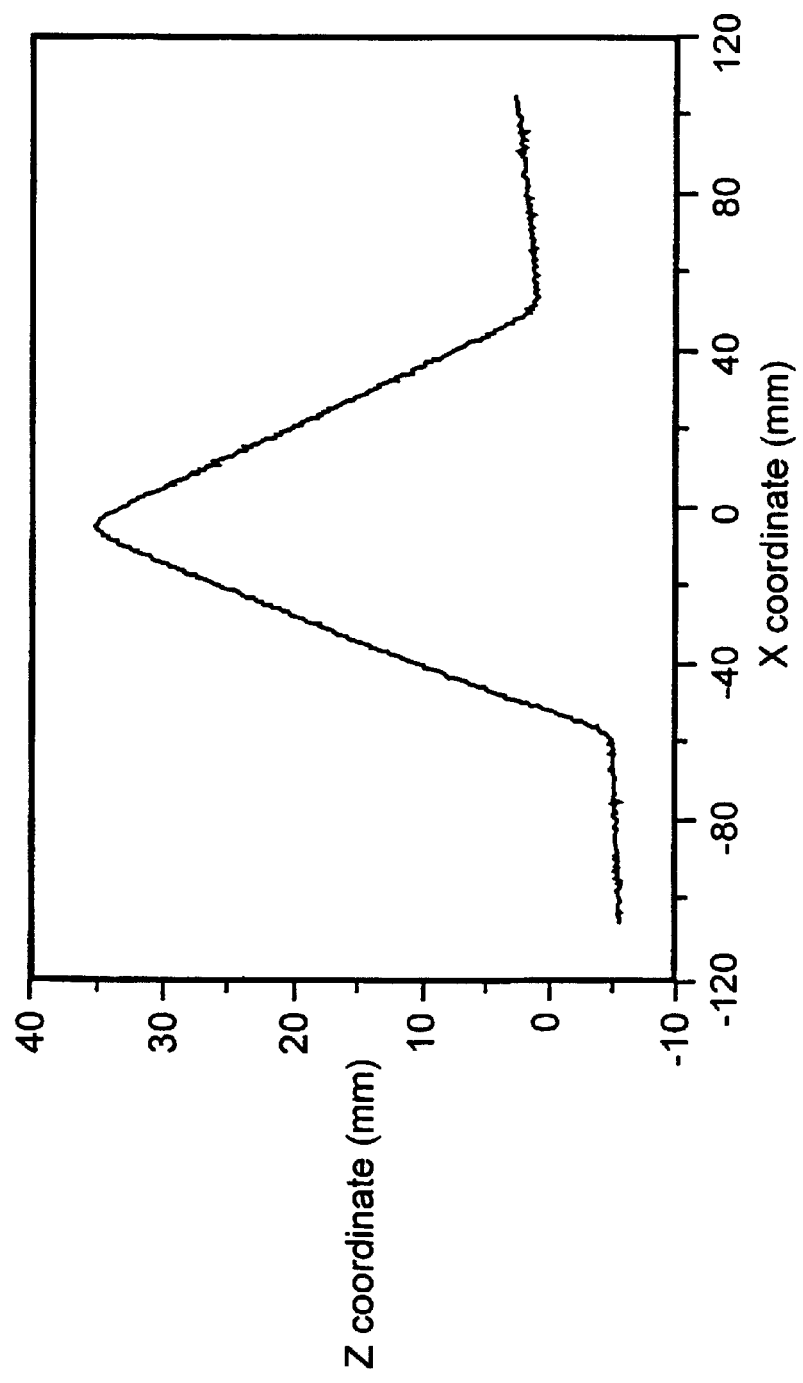
FIG. 18C is a cross sectional profile of the panel shown in FIG. 18A.

A sheet metal panel with a triangular shape in the center was measured. FIG. 18A is the 2-D photograph and FIG. 18B is the reconstructed 3-D surface contour of the panel. The cross sectional profile of the panel is shown in FIG. 18C. The measurement error of the height of the triangular shape was found to be within 0.5 mm.

Figure 19A:
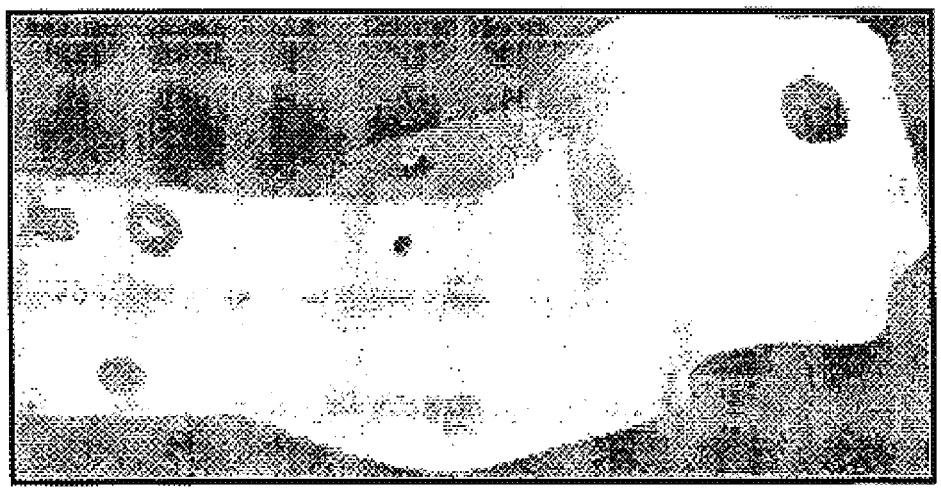
FIG. 19A is a view showing a two dimensional photograph of a master gauge.
Figure 19B:
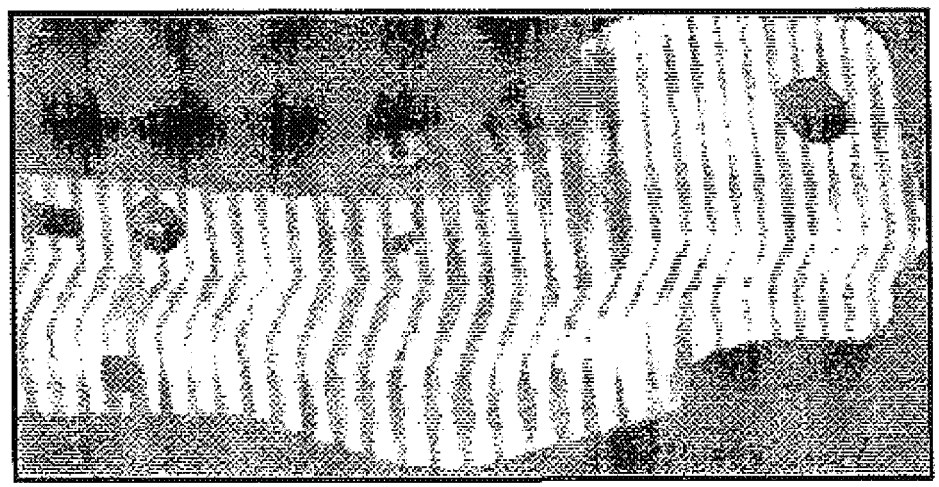
FIG. 19B is a view showing a fringe pattern being projected on the gauge shown in FIG. 19A having a phase angle of −120 degrees.
Figure 19C:
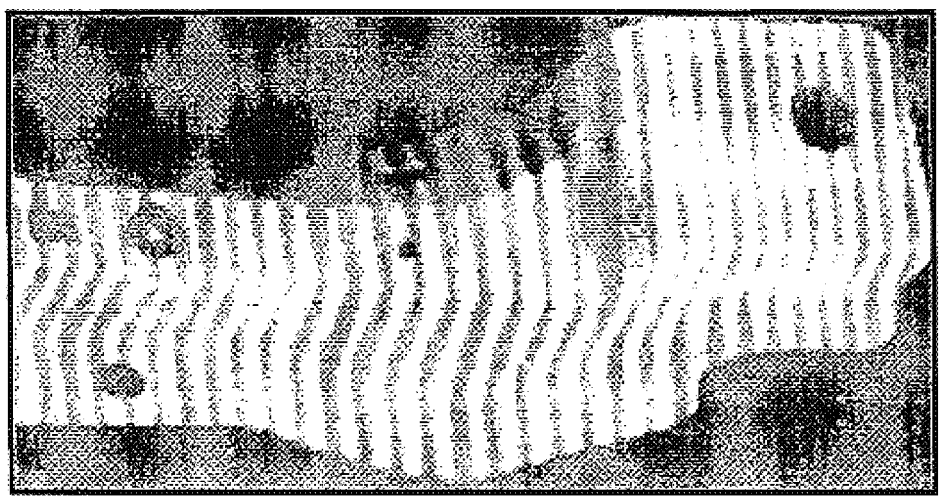
FIG. 19C is a view showing a fringe pattern being projected on the gauge shown in FIG. 19A having a phase angle of 0 degrees.
Figure 19D:
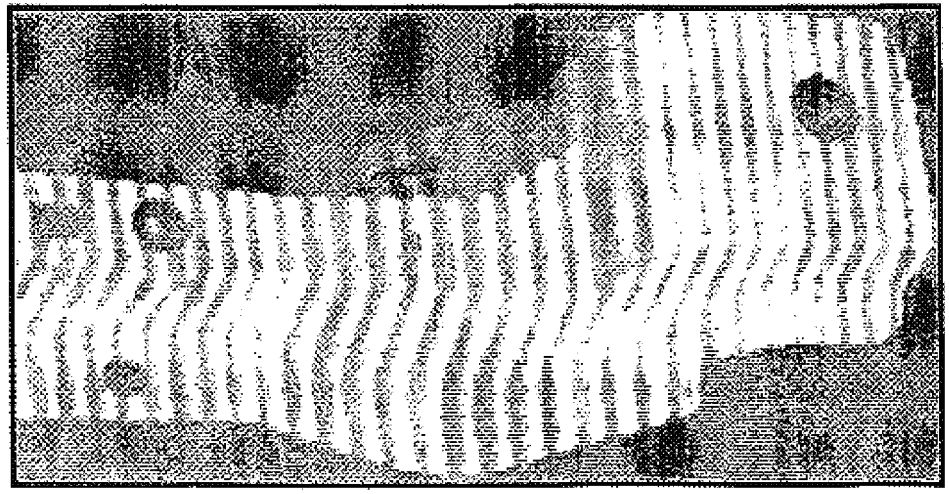
FIG. 19D is a view showing a fringe pattern being projected on the gauge shown in FIG. 19A having a phase angle of 120 degrees.
Figure 19E:
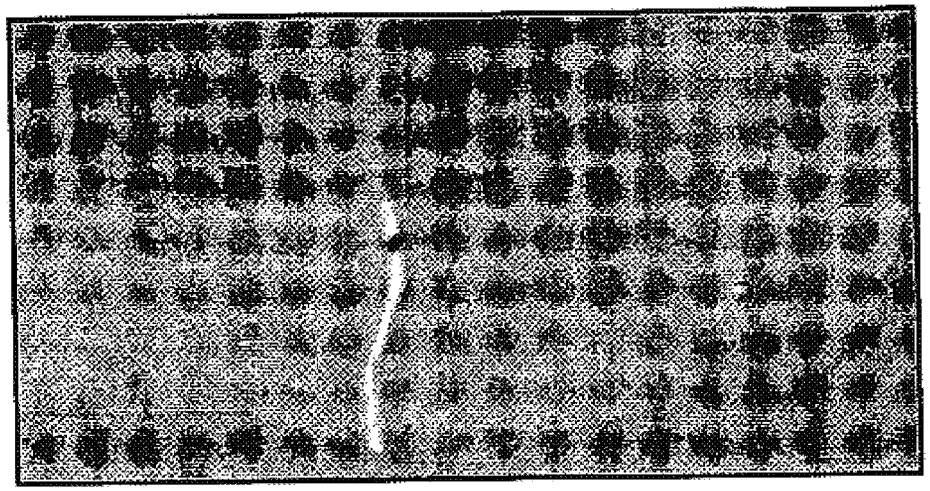
FIG. 19E is a view showing the absolute phase mark being projected as a line on the gauge shown in FIG. 19A.
Figure 19F:
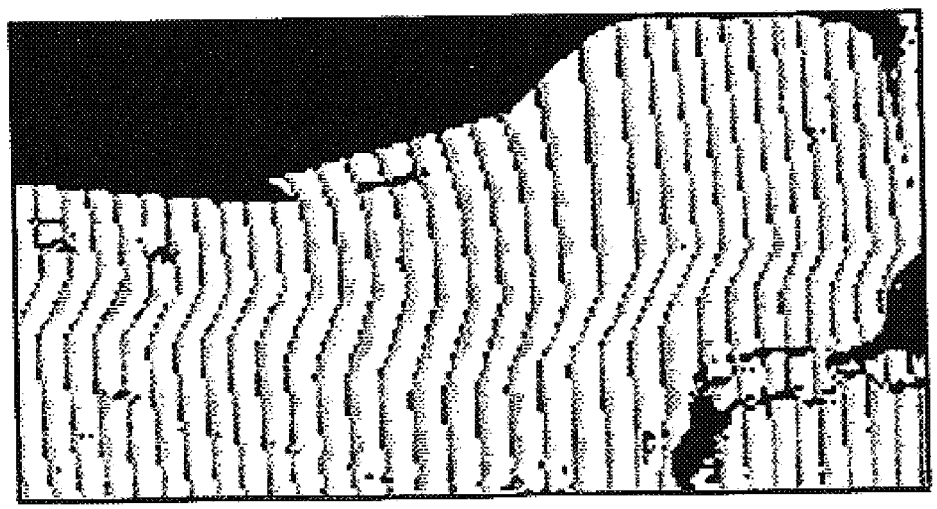
FIG. 19F is a view of a phase wrapped image generated from the information contained in FIG. 19B, 19C, and 19D.
Figure 19G:
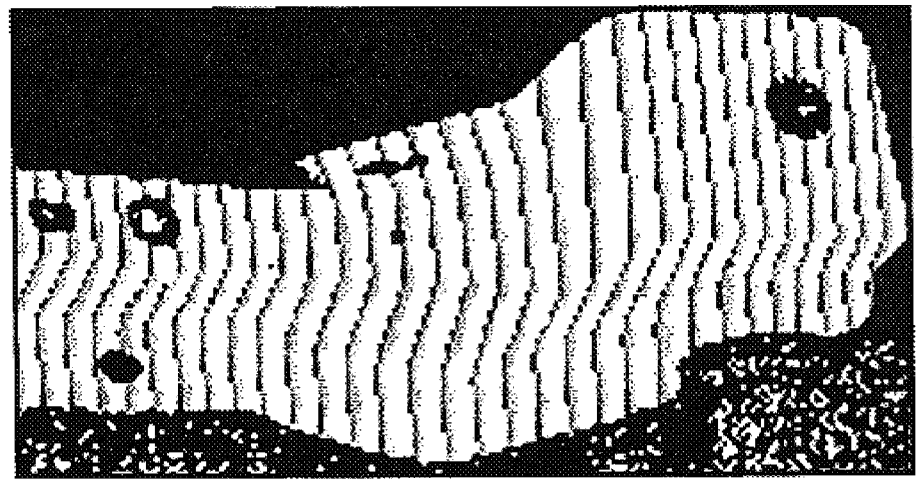
FIG. 19G is a view of the phase wrapped image shown in FIG. 19F after a mask is applied to remove background noise.
Figure 19H:
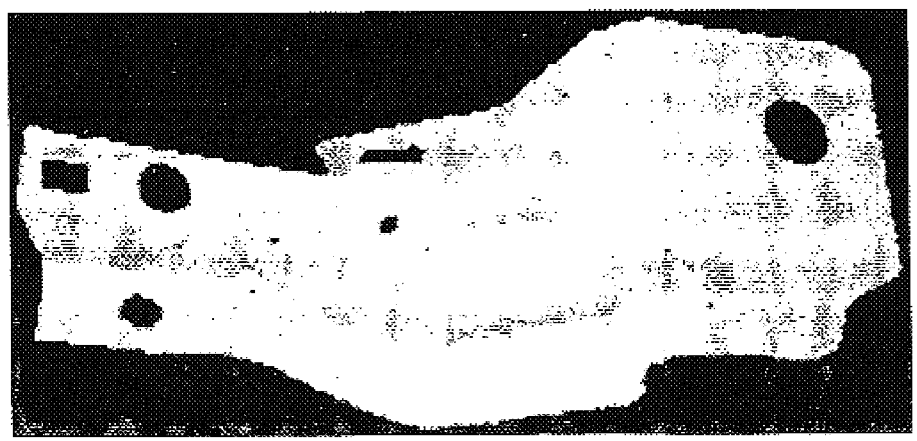
FIG. 19H is a view showing the reconstructed three dimensional surface contour of the gauge shown in FIG. 19A.

A master gauge with a complex geometry was measured. The results are shown in FIGS. 19A–H. FIG. 19A is the 2-D photograph of the gauge. FIGS. 19B, C and D are the three phase shifted fringe patterns. FIG. 19E shows the absolute phase mark being projected as one line of pixels that is parallel to the orientation of the fringe patterns projected in FIGS. 19B, 19C, and 19D. FIGS. 19F and G are the wrapped phase image before and after a mask is applied to remove background noise. The reconstructed 3-D surface contour is shown in FIG. 19H. It should be noted that the gauge surface was not completely diffusive. As a result, some spots on the surface were shinny, which caused image saturation and therefore loss of 3-D information at those spots. On the reconstructed 3-D surface contour, these spots are shown as small black holes. With the current setup information at these spots cannot be recovered. However, if an additional measurement can be done with the object or the system slightly rotated, the lost information can be recovered by combining the two results because the shinny spots will occur at different positions in the two measurements. Similarly, if an additional camera is used to capture the fringe patterns from a different angle, the problem can also be solved.

Thus, while there have been described what are presently believed to be the preferred embodiments of the invention, those skilled in the art will realize that changes and modifications may be made thereto without departing from the spirit of the invention, and is intended to claim all such changes and modifications as fall within the true scope of the invention.

What is claimed is:

1. A method of three dimensional surface contouring of an object having a surface defining a geometry, said method comprising the steps of:
    (a) generating a plurality of phase shifted digitally-interpretable fringe pattern signals, each of said signals being generated at a separate phase angle;
    (b) converting said signals into optical phase shifted fringe patterns;
    (c) projecting said fringe patterns onto said surface, said fringe patterns being distorted by said geometry of said object;
    (d) retrieving a reflection of each of said distorted fringe patterns individually;
    (e) generating a phase-wrapped image by combining said distorted fringe patterns;
    (f) generating a relative phase map of said surface of said object by unwrapping said phase-wrapped image;
    (g) projecting an absolute-phase mark onto said surface;
    (h) retrieving a reflection of said absolute-phase mark;
    (i) generating an absolute phase map of said surface by translating said relative phase map.

2. A method of three dimensional surface contouring as defined in claim 1, wherein at least three phase shifted fringe patterns are generated separated by 120 degrees.

3. A method of three dimensional surface contouring as defined in claim 1, wherein each of said phase shifted fringe patterns are projected sequentially.

4. A method of three dimensional surface contouring as defined in claim 1, wherein said plurality of phase shifted fringe patterns are color encoded and projected substantially simultaneously.

5. A method of three dimensional surface contouring as defined in claim 1, wherein said absolute-phase mark corresponds to at least one pixel.

6. A method of three dimensional surface contouring as defined in claim 1, wherein said absolute-phase mark is a line.

7. A method of three dimensional surface contouring as defined in claim 1, further comprising the step of:
    (j) transforming said absolute phase map into coordinates of said surface of said object.

8. A method of three dimensional surface contouring as defined in claim 1, wherein said absolute-phase mark is projected simultaneously with at least one of said fringe patterns.

9. A method of three dimensional surface contouring as defined in claim 8, wherein said absolute-phase mark is color encoded.

10. An apparatus for three dimensional surface contouring of an object having a surface defining a geometry, said apparatus comprising:
    a signal generator for generating an absolute-phase mark signal and a plurality of phase shifted digitally-interpretable fringe pattern signals, each of said signals being generated at a separate phase angle;
    a digital video projector connected to said signal generator for receiving and converting said fringe pattern signals into optical fringe patterns and projecting said fringe patterns onto said surface where said fringe patterns are distorted by said geometry of said object, said digital video projector receiving and converting said absolute-phase mark signal into an absolute-phase mark and projecting said absolute-phase mark onto said surface;
    an optical retrieval device for retrieving a reflection of said distorted fringe patterns and a reflection of said absolute-phase mark; and
    an image generator which combines said distorted fringe patterns to reconstruct a relative phase map of said surface of said object and translates said relative phase map to generate an absolute phase map.

11. An apparatus for three dimensional surface contouring as defined in claim 10, wherein said image generator is configured to transform said absolute phase map into coordinates of said surface of said object.

12. An apparatus for three dimensional surface contouring as defined in claim 10, wherein said absolute-phase mark corresponds to at least one pixel.

13. An apparatus for three dimensional surface contouring as defined in claim 10, wherein said absolute-phase mark is a line.

14. An apparatus for three dimensional surface contouring as defined in claim 10, wherein said absolute-phase mark is projected simultaneously with at least one of said fringe patterns.

15. An apparatus for three dimensional surface contouring as defined in claim 10, wherein said absolute-phase mark is color encoded.

16. An apparatus for three dimensional surface contouring as defined in claim 10, wherein each of said phase shifted fringe patterns are projected sequentially.

17. An apparatus for three dimensional surface contouring as defined in claim 10, wherein said plurality of phase shifted fringe patterns are color encoded and projected substantially simultaneously.

18. An apparatus for three dimensional surface contouring as defined in claim 10, wherein there are three phase shifted fringe patterns separated by 120 degrees.

19. An apparatus for three dimensional surface contouring as defined in claim 10, wherein there are a number of phase shifted fringe patterns which are separated by the quotient of 360 degrees divided by said number.

* * * * *

UNITED STATES PATENT AND TRADEMARK OFFICE
CERTIFICATE OF CORRECTION

PATENT NO. : 6,788,210 B1
DATED : September 7, 2004
INVENTOR(S) : Huang et al.

It is certified that error appears in the above-identified patent and that said Letters Patent is hereby corrected as shown below:

Column 6,
Line 14, now reads "FIG. 61" should read -- FIG. 6B --

Column 9,
Line 52, now reads "signal generator" should read -- signal generator 16 --

Column 11,
Line 11, now reads "$3(I_1 + I_3)^2$" should read -- $3(I_1 - I_3)^2$ --

Column 15,
Line 16, now reads "ROB" should read -- RGB --

Signed and Sealed this

Eleventh Day of January, 2005

JON W. DUDAS
*Director of the United States Patent and Trademark Office*